United States Patent
Vermani et al.

(10) Patent No.: US 9,049,155 B2
(45) Date of Patent: Jun. 2, 2015

(54) DUAL INTERPRETATION OF A LENGTH FIELD OF A SIGNAL UNIT

(75) Inventors: Sameer Vermani, San Diego, CA (US); Mohammad Hossein Taghavi Nasrabadi, San Diego, CA (US); Simone Merlin, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 13/604,030

(22) Filed: Sep. 5, 2012

(65) Prior Publication Data

US 2013/0235860 A1 Sep. 12, 2013

Related U.S. Application Data

(60) Provisional application No. 61/531,584, filed on Sep. 6, 2011, provisional application No. 61/562,063, filed on Nov. 21, 2011, provisional application No. 61/564,177, filed on Nov. 28, 2011, provisional application No. 61/566,961, filed on Dec. 5, 2011, provisional application No. 61/580,616, filed on Dec. 27, 2011, provisional application No. 61/585,479, filed on Jan. 11, 2012, provisional application No. 61/585,573, filed on Jan. 11, 2012, provisional application No. 61/670,092, filed on Jul. 10, 2012, provisional application No. 61/684,248, filed on Aug. 17, 2012.

(51) Int. Cl.
*H04W 40/02* (2009.01)
*H04L 12/741* (2013.01)
*H04W 28/06* (2009.01)
*H04L 1/00* (2006.01)
*H04L 27/26* (2006.01)
*H04L 5/00* (2006.01)

(52) U.S. Cl.
CPC .............. *H04L 45/74* (2013.01); *H04W 28/06* (2013.01); *H04L 1/0079* (2013.01); *H04L 5/0007* (2013.01); *H04L 5/005* (2013.01); *H04L 5/0053* (2013.01); *H04L 27/2602* (2013.01); *H04W 40/02* (2013.01)

(58) Field of Classification Search
CPC ..... H04W 28/06; H04W 84/12; H04W 84/18; H04L 69/22; H04L 5/0023
USPC .................. 370/338, 328, 310, 311, 474, 329
See application file for complete search history.

(56) References Cited

U.S. PATENT DOCUMENTS

| | | | |
|---|---|---|---|
| 6,633,564 B1 | 10/2003 | Steer et al. | |
| 8,155,102 B1 * | 4/2012 | Hakola et al. | 370/345 |

(Continued)

FOREIGN PATENT DOCUMENTS

| | | |
|---|---|---|
| EP | 1063830 A1 | 12/2000 |
| JP | 2012523774 A | 10/2012 |

(Continued)

OTHER PUBLICATIONS

International Search Report and Written Opinion—PCT/US2012/053966—ISA/EPO—Nov. 19, 2012.

(Continued)

*Primary Examiner* — Jamal Javaid
(74) *Attorney, Agent, or Firm* — S. Hossain Beladi

(57) ABSTRACT

A method includes receiving, at a first wireless device from a second wireless device, a signal (SIG) unit including a length field and an aggregation field. The length field is interpreted as a number of symbols in response to determining that the aggregation field has a first value. The length field is interpreted as a number of bytes in response to determining that the aggregation field has a second value.

16 Claims, 7 Drawing Sheets

(56) References Cited

U.S. PATENT DOCUMENTS

| | | | |
|---|---|---|---|
| 8,706,048 B2* | 4/2014 | Kim | 455/69 |
| 2003/0003867 A1* | 1/2003 | Kawamura | 455/41 |
| 2005/0058073 A1 | 3/2005 | Ayyagari et al. | |
| 2005/0238016 A1* | 10/2005 | Nishibayashi et al. | 370/389 |
| 2006/0023624 A1 | 2/2006 | Han et al. | |
| 2007/0143655 A1* | 6/2007 | Niu et al. | 714/752 |
| 2007/0298742 A1 | 12/2007 | Ketchum et al. | |
| 2008/0013504 A1* | 1/2008 | Nishibayashi et al. | 370/338 |
| 2008/0109711 A1 | 5/2008 | Morioka et al. | |
| 2009/0092154 A1 | 4/2009 | Malik et al. | |
| 2009/0257397 A1 | 10/2009 | Kwak et al. | |
| 2010/0046518 A1 | 2/2010 | Takagi et al. | |
| 2010/0061400 A1* | 3/2010 | Hong et al. | 370/466 |
| 2010/0260159 A1 | 10/2010 | Zhang et al. | |
| 2011/0063991 A1 | 3/2011 | Sampath et al. | |
| 2011/0199971 A1 | 8/2011 | Kim et al. | |
| 2011/0280182 A1 | 11/2011 | Kim et al. | |
| 2013/0170411 A1 | 7/2013 | Vermani et al. | |

FOREIGN PATENT DOCUMENTS

| | | |
|---|---|---|
| WO | 2008082352 A1 | 7/2008 |
| WO | WO-2010089825 A1 | 8/2010 |
| WO | WO-2010120692 A1 | 10/2010 |

OTHER PUBLICATIONS

Syed Aon Mujtaba: "TGn synch proposal technical specification", IEEE P802.11 Wireless LANS, XX, XX, No. 802.11-04/0889R5, May 13, 2005, pp. 1-134, XP002418851, Sections 6.1.3, 6.3, 11.2.3 and Table 29.

* cited by examiner

DUAL INTERPRETATION OF A LENGTH FIELD OF A SIGNAL UNIT

CROSS-REFERENCE TO RELATED APPLICATIONS

The present application claims priority from the following commonly owned U.S. Provisional patent applications, the contents of which are expressly incorporated herein by reference in their entirety: No. 61/531,584 filed Sep. 6, 2011, No. 61/562,063 filed Nov. 21, 2011, No. 61/564,177 filed Nov. 28, 2011, No. 61/566,961 field Dec. 5, 2011, No. 61/580,616 filed Dec. 27, 2011, No. 61/585,479 filed Jan. 11, 2012, No. 61/585,573 filed Jan. 11, 2012, No. 61/670,092 filed Jul. 10, 2012, and No. 61/684,248 filed Aug. 17, 2012.

FIELD OF THE DISCLOSURE

The present disclosure relates generally to wireless communications, and more specifically to SIGNAL (SIG) units communicated via wireless networks.

BACKGROUND

In many telecommunication systems, communications networks are used to exchange messages among several interacting spatially-separated devices. Networks may be classified according to geographic scope, which could be, for example, a wide area, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may include packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include decreasing the overhead in transmitting payloads in data packets.

In a particular embodiment, a method includes receiving, at a first wireless device from a second wireless device, a signal (SIG) unit including a length field and an aggregation field. The method also includes interpreting the length field as a number of symbols in response to determining that the aggregation field has a first value and interpreting the length field as a number of bytes in response to determining that the aggregation field has a second value.

In another particular embodiment, a method includes generating, at a second wireless device, a SIG unit to be transmitted to a first wireless device, where the SIG unit includes a length field and an aggregation field. The method also includes, in response to determining to use aggregated transmission to the first wireless device, setting the aggregation field to a first value and setting the length field to a number of symbols. The method further includes, in response to determining not to use the aggregated transmission to the first wireless device, setting the aggregation field to a second value and setting the length field to a number of bytes.

In another particular embodiment, a method includes receiving, at a wireless device, a frame via a sub-1 gigahertz (GHz) wireless network. The frame includes a SIG unit having a length field and an aggregation field. The method also includes, in response to determining that the frame is associated with a 1 megahertz (MHz) bandwidth mode, interpreting the length field as a number of bytes or a number of symbols based on a value of the aggregation field. The method further includes, in response to determining that the frame is not associated with the 1 MHz bandwidth mode, determining whether the frame includes a short format preamble or a long format preamble. The method includes, in response to determining that the frame includes the short format preamble, interpreting the length field as a number of bytes or a number of symbols based on the value of the aggregation field. The method also includes, in response to determining that the frame includes the long format preamble, determining whether the frame is a single user (SU) frame or a multi user (MU) frame. The method further includes, in response to determining that the frame is the SU frame, interpreting the length field as a number of bytes or a number of symbols based on the value of the aggregation field. The method includes, in response to determining that the frame is the MU frame, interpreting the length field as a number of symbols.

In another particular embodiment, an apparatus includes a receiver configured to receive a SIG unit having a length field and an aggregation field. The apparatus also includes a processor configured to interpret the length field as a number of symbols in response to determining that the aggregation field has a first value and to interpret the length field as a number of bytes in response to determining that the aggregation field has a second value.

In another particular embodiment, an apparatus includes a processor configured to generate a SIG unit having a length field and an aggregation field. The processor is also configured to, in response to determining to use aggregated transmission, set the aggregation field to a first value and set the length field to a number of symbols. The processor is further configured to in response to determining not to use the aggregated transmission, set the aggregation field to a second value and set the length field to a number of bytes. The apparatus also includes a transmitter configured to transmit the SIG unit.

DETAILED DESCRIPTION

Figure 1:
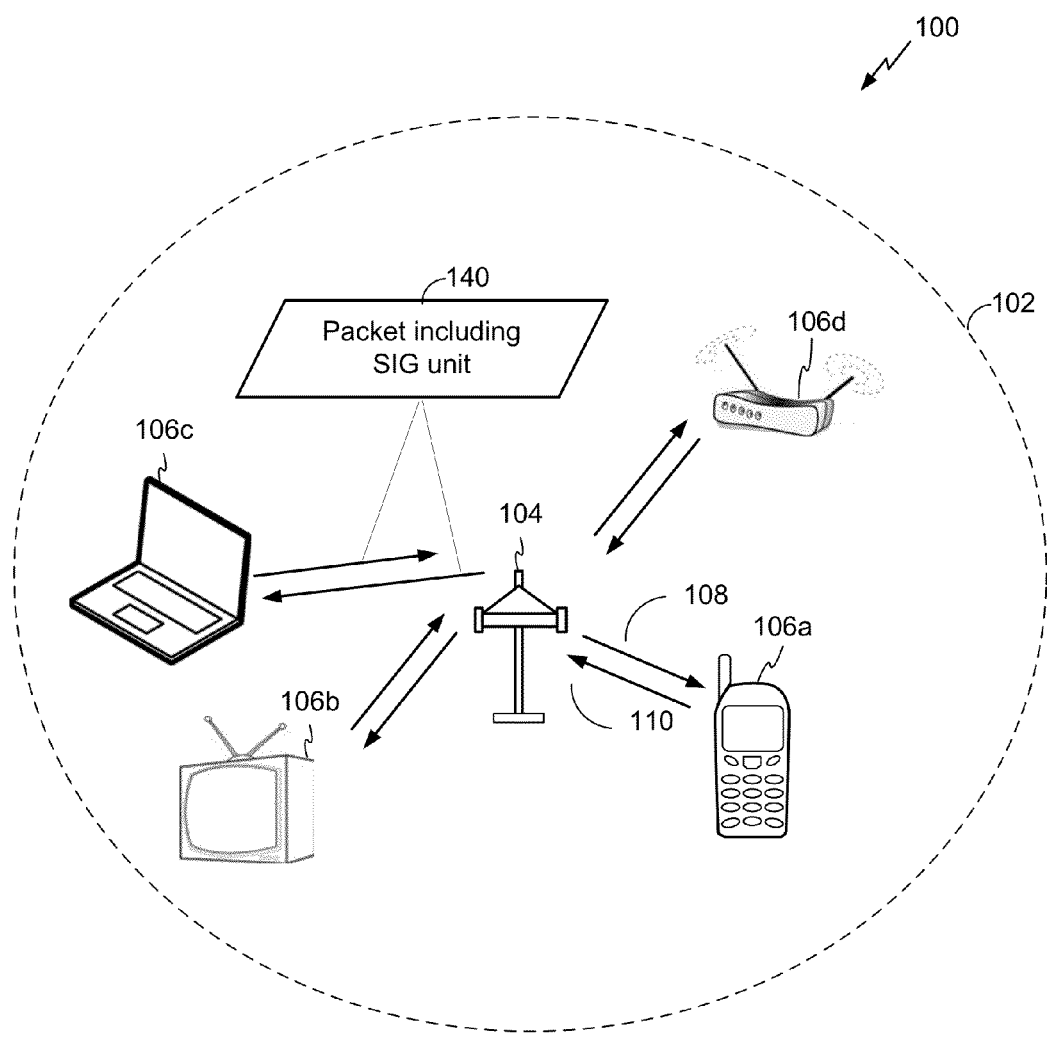
FIG. 1 illustrates an example of a wireless communication system in which aspects of the present disclosure may be employed.

Various aspects of the systems, apparatuses, and methods are described more fully hereinafter with reference to the accompanying drawings. The teachings of the disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of particular aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN, and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station ("STA") may also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

As further described herein, packets (e.g., illustrative packet 140) (alternately referred to herein as data units or frames) transmitted between the AP 104 and the STAs 106 may include a SIGNAL (SIG) unit (alternately referred to herein as a SIG field). For example, the SIG unit may be included in a physical layer (PHY) preamble of a packet. The SIG unit may include control information that can be used to decode the packet or a data payload thereof. In a particular embodiment, a length field of the SIG unit may indicate a length of the packet or data payload thereof. The length field may have a fixed size, such as nine bits. However, the unit of measurement represented by the length field may vary. For example, when data aggregation is not in use (e.g., indicated by an aggregation field of the SIG unit having a first value), the length field may represent a number of bytes. Since $2^9=512$, the SIG unit may be able to indicate packet sizes ranging from 0 to 511 bytes. When data aggregation is in use (e.g., indicated by the aggregation field of the SIG unit having a second value), the length field may represent a number of symbols and may thus be able to represent sizes larger than 511 bytes.

In a particular embodiment, as further described herein, one or more fields of a SIG unit may support the use of "exceptional" values to indicate alternative data formats, payload lengths, and types. For example, a particular value of a particular field of the SIG unit may indicate that another field of the SIG unit is to be interpreted unconventionally, that the SIG unit is part of a packet that has a zero-length payload, or that the SIG unit is part of a particular type of packet. For example, a particular value of a modulation and coding scheme (MCS) field may indicate that the SIG unit is part of an acknowledgement (ACK) packet that has a zero-length payload (e.g., an ACK packet that is represented entirely by PHY data).

Figure 2:
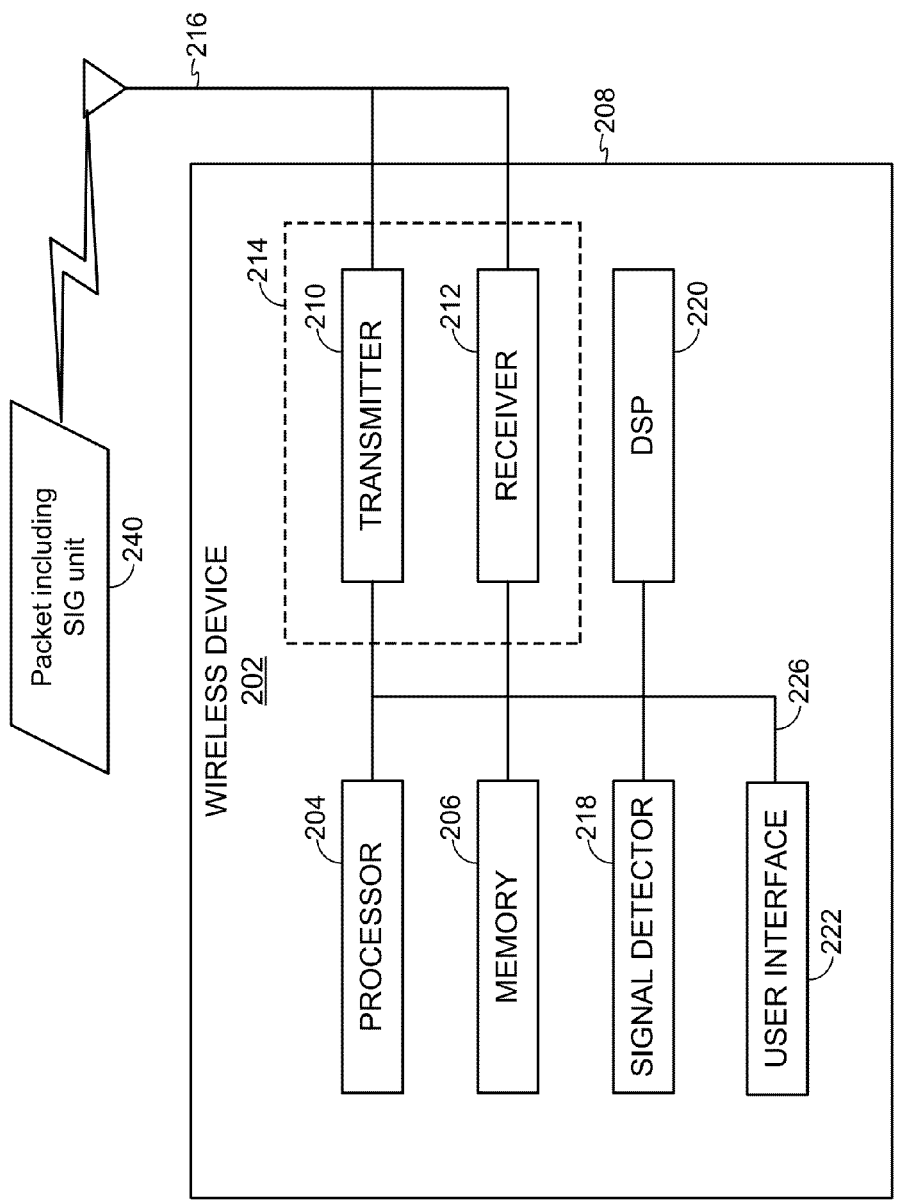
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may include the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas. As further described herein, the transmitter 210 may be means for transmitting a SIG unit and the receiver 212 may be means for receiving a SIG unit.

The wireless device 202 may also include a signal detector 218 that may be used in an effort to detect and quantify the level of signals received by the transceiver 214. The signal detector 218 may detect characteristics of signals, such as total energy, energy per subcarrier per symbol, and power spectral density. The wireless device 202 may also include a digital signal processor (DSP) 220 for use in processing signals. The DSP 220 may be configured to generate a data unit for transmission. In some aspects, the data unit may include a physical layer data unit (PPDU). In some aspects, the PPDU is referred to as a packet. As further described herein, one or more of the processor 204, the signal detector 218, and the DSP 220 may be means for generating a SIG unit, means for interpreting a length field of a SIG unit, means for determining whether a field of the SIG unit has a value indicating a zero-length payload, and/or means for decoding the SIG unit based on the determination.

The wireless device 202 may further include a user interface 222 in some aspects. The user interface 222 may include a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may include an AP 104 or an STA 106, and may be used to transmit and/or receive communications. For example, the wireless device 202 may communicate a packet 240 that includes a SIG unit. As further described herein, the packet 240 may include a SIG unit having a length field that can be interpreted in multiple ways based on the value of another field in the SIG unit. For example, the length field may be interpreted as a number of bytes or a number of symbols based on the value of an aggregation field. Alternately, or in addition, the presence of a particular value in a particular field of the SIG unit may indicate that the packet 240 has a zero-length payload (e.g., is a short ACK that is entirely represented by PHY data).

Figure 3:
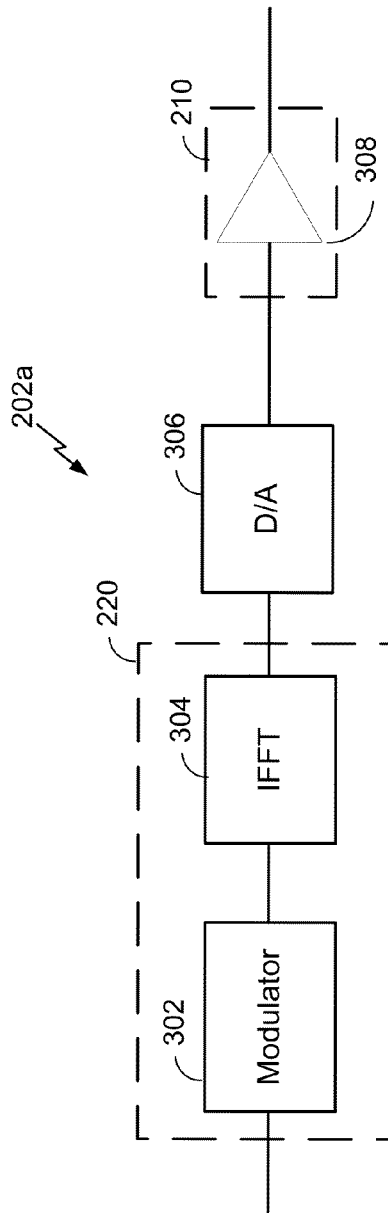
FIG. 3 shows a functional block diagram of exemplary components that may be utilized in the wireless device of FIG. 2 to transmit wireless communications.

FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit data units with SIGNAL units (e.g., the packet 240 of FIG. 2) in various communication modes, as will be discussed in additional detail below. For ease of reference, the wireless device 202 configured with the components illustrated in FIG. 3 is hereinafter referred to as a wireless device 202a.

The wireless device 202a may include a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 includes a QAM (quadrature amplitude modulation) modulator, for example a 16-QAM modulator or a 64-QAM modulator. In other aspects, the modulator 302 includes a binary phase-shift keying (BPSK) modulator or a quadrature phase-shift keying (QPSK) modulator.

The wireless device 202a may further include a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate a data unit for transmission. In some aspects, the modulator 302 and the transform module 304 may be configured to generate a data unit including a plurality of fields including control information and a plurality of data symbols. The fields including the control information may include one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202a may further include a digital to analog converter (DAC, designated "D/A" in FIG. 3) 306 configured to convert the output of the transform module into an analog signal. For example, the time-domain output of the transform module 304 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmit processor.

The analog signal may be wirelessly transmitted by the transmitter 210. The analog signal may be further processed before being transmitted by the transmitter 210, for example by being filtered or by being upconverted to an intermediate or carrier frequency. In the aspect illustrated in FIG. 3, the transmitter 210 includes a transmit amplifier 308. Prior to being transmitted, the analog signal may be amplified by the transmit amplifier 308. In some aspects, the amplifier 308 includes a low noise amplifier (LNA).

The transmitter 210 is configured to transmit one or more packets or data units in a wireless signal based on the analog signal. The data units may be generated using the processor 204 and/or the DSP 220, for example using the modulator 302 and the transform module 304 as discussed above. Data units that may be generated and transmitted as discussed above are described in additional detail below with respect to FIGS. 5-11.

Figure 4:
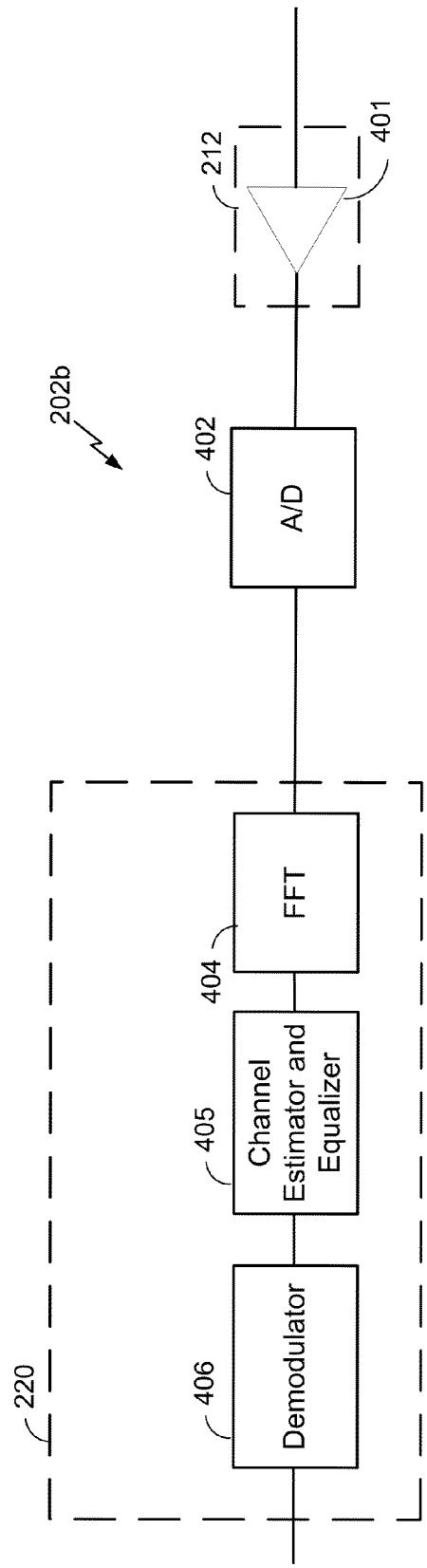
FIG. 4 shows a functional block diagram of exemplary components that may be utilized in the wireless device of FIG. 2 to receive wireless communications.

FIG. 4 illustrates various components that may be utilized in the wireless device 202 to receive wireless communications. The components illustrated in FIG. 4 may be used, for example, to receive OFDM communications. In some aspects, the components illustrated in FIG. 4 are used to receive data units that include one or more SIGNAL units (e.g., the packet 240 of FIG. 2), as will be discussed in additional detail below. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets or data units in a wireless signal. Data units that may be received and decoded or otherwise processed as discussed below are described in additional detail with respect to FIGS. 5-11.

In the aspect illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 includes a LNA.

The wireless device 202b may include an analog to digital converter (ADC, designated "A/D" in FIG. 4) 402 configured to convert the amplified wireless signal from the receiver 212 into a digital representation thereof. Further to being amplified, the wireless signal may be processed before being converted by the analog to digital converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further include a transform module 404 configured to convert the representation the wireless signal into a frequency spectrum. In FIG. 4, the transform module 404 is illustrated as being implemented by a fast Fourier transform (FFT) module. The transform module 404 may be programmable, and may be configured to perform FFT with different configurations. In one aspect, for example, the transform module 404 may be configured to perform either a 32-point FFT or a 64-point FFT. In some aspects, the transform module 404 may identify a symbol for each point that it uses.

The wireless device 202b may further include a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further include a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 includes a QAM (quadrature amplitude modulation) demodulator, for example a 16-QAM demodulator or a 64-QAM demodulator. In other aspects, the demodulator 406 includes a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 includes one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. In various embodiments, data units can include Mac Protocol Data Units (MPDU) and/or Aggregated Mac Protocol Data Units (A-MPDU). The payload may be transmitted using one or more data symbols. The systems, methods, and devices herein may utilize data units with training fields whose peak-to-power ratio has been minimized.

The data units may be transmitted, for example, in a 1 MHz mode or a 2 MHz mode. The preamble may be common for a 1 MHz normal mode and for a 1 MHz 2× repetition mode. In a 2 MHz mode, the SIG field may span 52 data tones. In some embodiments, a SIG field may be replicated every 2 MHz for transmissions greater than 2 MHz. In addition, for transmission greater than 2 MHz, there may be 2 SIG-A fields and 1 SIG-B field for MU mode. In some embodiments, in a 1 MHz mode there may be 6 SIG A fields. In a 1 MHz mode, the SIG field may span 24 data tones. In some embodiments, the 2 MHz PHY transmission is an OFDM based waveform consisting of 64 tones (52 data tones, 4 pilot tones, 7 guard tones, and 1 DC tone). The tone spacing for other bandwidth modes may be the same as the tone spacing for a 2 MHz mode. In some embodiments, a 1 MHz mode includes 32 tones (24 data tones, 2 pilot tones, 5 guard tones, and 1 DC tone).

Figure 5:
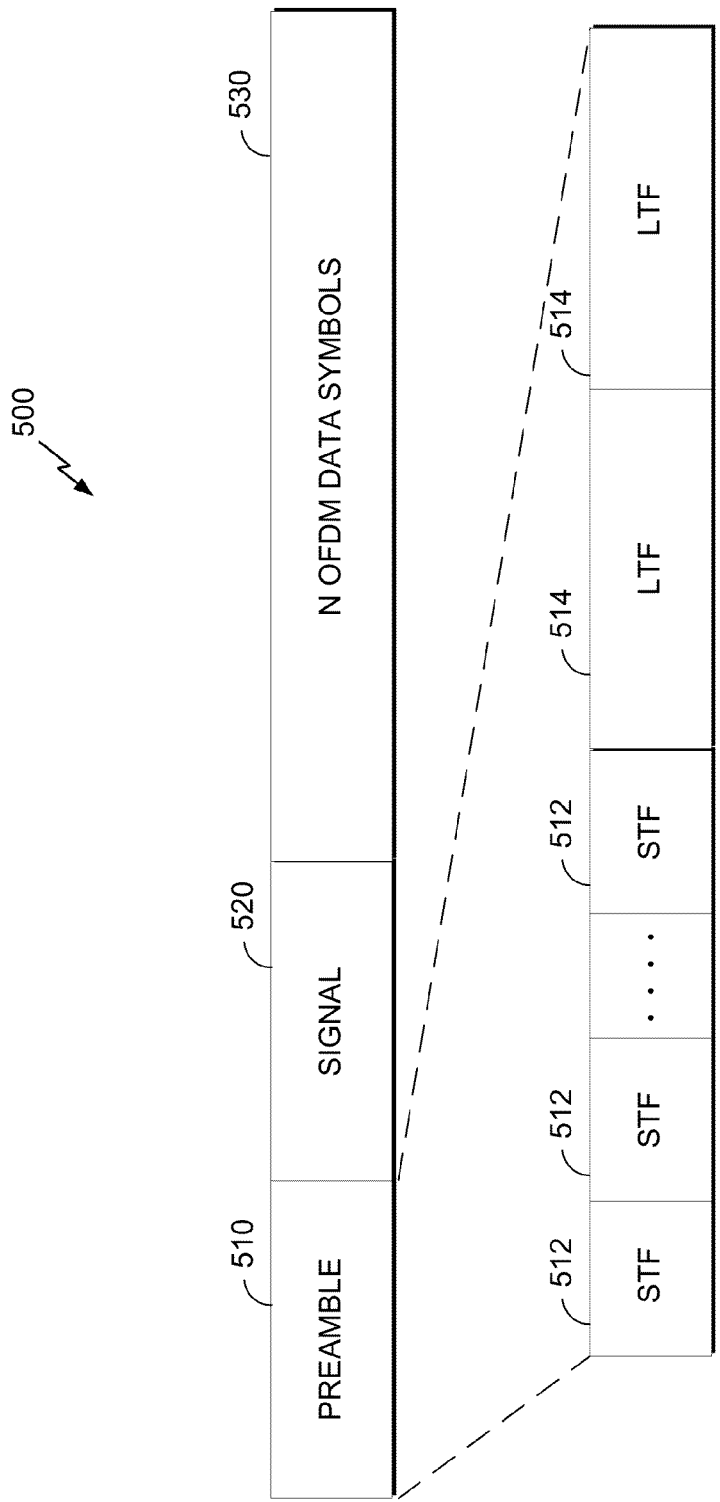
FIG. 5 illustrates an example of a physical layer data unit.

FIG. 5 illustrates an example of a data unit 500. The data unit 500 may include a PPDU for use with the wireless device 202. In an embodiment, the data unit 500 may be used by legacy devices or devices implementing a legacy standard or downclocked version thereof.

The data unit 500 includes a preamble 510. The preamble 510 may include a variable number of repeating STF 512 symbols, and one or more LTF 514 symbols. In one implementation 10 repeated STF 512 symbols may be sent followed by two LTF 512 symbols. The STF 512 may be used by the receiver 212 to perform automatic gain control to adjust the gain of the receive amplifier 401, as discussed above. Furthermore, the STF 512 sequence may be used by the receiver 212 for packet detection, rough timing, and other settings. The LTF 514 may be used by the channel estimator and equalizer 405 to form an estimate of the channel over which the data unit 500 is received.

Following the preamble 510 in the data unit 500 is a SIGNAL unit 520. The SIGNAL 520 unit may be represented using OFDM and may include information relating to the transmission rate, the length of the data unit 500, and the like. The data unit 500 additionally includes a variable number of data symbols 530, such as OFDM data symbols. In an embodiment, the preamble 510 can include the SIGNAL unit 520. In an embodiment, one or more of the data symbols 530 can be a payload.

When the data unit 500 is received at the wireless device 202*b*, the size of the data unit 500 including the LTFs 514 may be computed based on the SIGNAL unit 520, and the STF 512 may be used by the receiver 212 to adjust the gain of the receive amplifier 401. Further, a LTF may be used by the channel estimator and equalizer 405 to form an estimate of the channel over which the data unit 500 is received. The channel estimate may be used by the DSP 220 to decode the plurality of data symbols 530 that follow the preamble 510.

The data unit 500 illustrated in FIG. 5 is only an example of a data unit that may be used in the system 100 and/or with the wireless device 202. Those having ordinary skill in the art will appreciate that a greater or fewer number of the STFs 412 or LTFs 514 and/or the data symbols 530 may be included in the data unit 500. In addition, one or more symbols or fields may be included in the data unit 500 that are not illustrated in FIG. 5, and one or more of the illustrated fields or symbols may be omitted.

When using OFDM, a number of orthogonal subcarriers of the frequency band may be used. The number of subcarriers that are used may depend on a variety of considerations including the available frequency bands for use, bandwidth and any associated regulatory constraints. The number of subcarriers used is correlated to the size of an FFT module as each modulated subcarrier is an input to an IFFT module to create the OFDM signal to be transmitted. As such, in some implementations a larger FFT size (e.g., 64, 128, 256, or 512) may, corresponding to transmitting data using more subcarriers, be desired to achieve a larger bandwidth. In other implementations, a smaller FFT size may be used for transmitting data in a narrow bandwidth. The number of subcarriers, and therefore FFT size, may be chosen so as to comply with regulatory domains with certain bandwidth restrictions. For example, an FFT size of 32 may be provided for certain implementations (e.g., for down clocked implementations), and provided for use for 802.11ah. As such, the wireless device 202*a* may include several transform modules 304, each implemented as an FFT or IFFT module, each of a different size so as to comply with the number of subcarriers specified to be used. At least one of the transform modules 304 may be a 32-point size IFFT or FFT module according to certain aspects described herein. In an embodiment, the transform module 304 may be configured to selectively perform FFT in a plurality of different sizes based on a detected FFT mode. In an aspect, a multi-mode transform module may include a plurality of FFT modules, each configured to use different FFT sizes, the output of each of which may be selected based on a detected FFT mode.

As discussed above with respect to FIGS. 2 and 3, the wireless device 202*a* can be configured to operate in various FFT modes. In various embodiments, the wireless device 202*a* can be configured to use a 64-point FFT size in conjunction with a higher-bandwidth channel than the 32-point FFT channel. For example, the 64-point FFT channel can have twice the bandwidth of the 32-point FFT channel. In an embodiment, the transform module 304 can be configured to use a 64-point FFT size in conjunction with a 2 MHz channel, and the transform module 304 can be configured to use a 32-point FFT channel can be a 1 MHz channel. In an embodiment, the transform module 304 can be configured to selectively use a plurality of different FFT sizes. In another embodiment, a plurality of different IFFTs can each be configured to use a different FFT size, the output of which can be selectively routed to the DAC 306.

In some embodiments, the data unit 500 may include a Partial air identifier (AID) or PAID field. The PAID field includes a partial identifier for one or more receivers or STAs 106. The PAID field may be used by each STA 106 as an early indicator of whether the STA 106 should receive and decode the remainder of the data unit 500. For example, if the PAID field indicates that the data unit 500 is not intended for a particular STA 106, that STA 106 may discontinue processing the data unit 500 in order to save power.

In some embodiments, the PAID field includes a unique identification of the STA 106, such as a full local identifier (e.g., an AID) of the STA 106. In some embodiments, the PAID field includes a partial local identifier of the STA 106, such as a portion of the AID, for example, some number of least significant bits (LSBs) of the AID. In some embodiments, the PAID field includes a partial local identifier of the STA 106 and a partial local identifier of the associated BSS or the AP 104.

In some embodiments, the PAID field is not explicitly transmitted, but is encoded in another field, such as a cyclic redundancy check (CRC) field. For example, a CRC may be calculated with the PAID field and other fields of the data unit 500 which are transmitted. The STA 106 receives the transmitted fields and the CRC field. The STA 106 then calculates a CRC based on the received fields and the PAID field which indicates that the STA 106 should continue processing the data unit 500. If the CRC calculated by the STA 106 matches the CRC received, the STA 106 continues processing the data unit 500.

In some embodiments, the data unit 500 includes multiple sets of parameters. A first set of parameters may include parameters used to determine how long the STA 106 is in a power down mode if the data unit 500 is not intended for the STA 106. A second set of parameters may include other parameters of the data unit 500, such as those discussed below. The PAID field may be included in the second set. In some embodiments, each of the sets of parameters is covered by an independent CRC specific to that set. Each STA 106 determines based on the PAID field whether the data unit 500 is to be decoded. If the data unit 500 is not to be decoded, the STA 106 defers for a time based on the information in the first set of parameters. In some embodiments, the CRCs are in the SIG field. In some embodiments, the CRC of the second set of parameters is in the service field after the preamble, for example if the data unit 500 is for non-AMPDU.

In some embodiments, the PAID field is in the service field. In such embodiments, the PAID field may be sent with the same MCS as the data in the SIG field. In some embodiments, the PAID field may immediately precede the MAC header.

In some embodiments, the data unit 500 includes a random seed for use by the STA 106 to descramble the data. In some embodiments, at least a portion of the PAID field may also be the seed. In some embodiments, the STA 106 may recognize multiple, for example, consecutive, PAID fields as new seeds for retransmissions.

In some embodiments, the data unit 500 includes no service field. In such embodiments the bandwidth may be indicated, for example, in the SIG field or in the MAC header.

Similarly, a CRC may be included, for example, in the SIG field or in the MAC header. Additionally, or alternatively, the random seed may be included, for example, in the SIG field or in the MAC header. In some embodiments, the random seed may also be included in the PAID field.

In some embodiments, the PAID field is scrambled with the data in the SIG field and the scrambled sequence is covered by a CRC. Alternatively, the PAID field may be appended to the SIG field and the set is covered by a CRC.

In some embodiments, the PAID field is not static over multiple transmissions to a STA 106. For example, the PAID field may change each transmission or may change after each number of transmissions. The PAID field may be changed according to an algorithm common to both the transmitting device and the receiving STA 106. For example, the next in a series of numbers can be used. In some embodiments, the next PAID field value is equal to the previous PAID field value plus one. In some embodiments, the algorithm includes generating the PAID field based in part on the timing synchronization function (TSF) or a hash of the TSF of the network. The calculations of the PAID field may occur, for example, every second, every 2, 3, 4, 5, or other number of seconds, every minute, every 2, 3, 4, 5, or other number of minutes. Accordingly, errors due to TSF misalignment will be rare.

In some embodiments, the receiving STA 106 communicates to the transmitting device the PAID field value or an indication of the PAID field value to use for a next transmission. For example, the next PAID field value or an indication of the next PAID field value may be included in an ACK sent in response to a received transmission from the transmitting device.

For example, in a first data unit, the AP 104 uses a default PAID field value, to which the STA 106 responds by decoding the first data unit. The STA 106 sends an ACK to acknowledge receipt of the first data unit. In the ACK communication, the STA 106 indicates a next PAID field value. Subsequently, in a second data unit, the AP 104 uses the next PAID field value, to which the STA 106 responds by decoding the second data unit.

The default PAID field value may be, for example, a broadcast PAID field value or may be, for example, a PAID field value associated with the particular STA 106 to which the first and second data units are intended. The next PAID field value may, for example, be a next in a series of numbers or may, for example, be a hash of at least a portion of the first data unit, such as the data of the first data unit.

In some embodiments, if the AP 104 does not receive the ACK, the AP 104 may transmit the second data unit using the default PAID field value or the latest PAID field value for which an ACK was received. Accordingly, the STA 106 may be configured to decode data units which include any of multiple PAID field values. For example, the STA 106 may be configured to decode data units which include any of the default PAID field value, the PAID field value for the latest received and decoded data unit, and the PAID field value indicated in the latest ACK transmitted by the STA 106. In such embodiments, the AP 104 may be configured to select one of the multiple PAID field values for the STA 106. Such selection, may, for example, be random or pseudorandom.

In some embodiments, the PAID field is assigned by the AP 104 with, for example, a management exchange. For example, the PAID field may be reassigned periodically. In some embodiments, the STA 106 may request or assign a new PAID field for a next transmission from the AP 104. For example, if a STA 106 decodes multiple data units which are not intended for that STA 106, the STA 106 may request or designate a new PAID field value.

In some systems, unicast packet filtering is possible through MAC address. In such systems, the PAID field may be useful in enhancing packet filtering based on packet content.

In some embodiments, the PAID field may identify a type of the data unit. In some embodiments, the PAID field may additionally identify the content of the data unit. For example, if the data unit includes a traffic indication map (TIM) for a group of STAs, the PAID field may identify the group of STAs the data unit is intended for. In some embodiments, certain values of the PAID field may be used to indicate that the data unit is a beacon and to identify the beacon change sequence number. If the STA is already up to date the STA can ignore the remainder of the data unit after processing the PAID field.

In an embodiment, for 64-point FFT signals, the data unit 500 can include a 240 μs preamble 510. The preamble 510 can include a single 2-symbol STF 512, a single 2-symbol LTF 514, and a 2-symbol SIGNAL unit 520. The SIGNAL unit 520 can include one or more of the fields shown below in Table 1. Although the fields are shown having a particular length, and in a particular order, in various embodiments, one or more fields may be rearranged, added, omitted, or may have a different length. In some embodiments, the SIGNAL unit 520 has all of the fields shown in Table 1. In some embodiments, the SIGNAL unit 520 has only the fields shown in Table 1. In some embodiments, the SIGNAL unit 520 has the fields shown in Table 1 in the order shown in Table 1. In some embodiments, at least a portion of the information of multiple fields shown in Table 1 is included in a single field. For example, the first and second fields of Table 1 may be collapsed into a single field including the information of both the first and second fields.

TABLE 1

| Field of SIG-A (64-Point FFT) | Bits |
| --- | --- |
| MCS | 4 |
| Num SS | 2 |
| SGI | 1 |
| Length | 12 |
| Aggregation | 1 |
| BW | 2 |
| Coding | 1 |
| AID | 12 |
| STBC | 1 |
| Smoothing | 1 |
| Reserved | 1 |
| CRC | 4 |
| Tail | 6 |
| Total | 48 |

In the aspect shown in Table 1, the SIGNAL unit 520 can include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "Num SS" field indicating the number of spatial streams used. The "Num SS" field can be 2-bits long. The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "length" field indicating length of the payload 530. The "length" field can be 12-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 4095 bytes. The SIGNAL unit 520 can further include an "aggregation" field indicating whether A-MPDU is being used. The "aggregation" field can be 1-bit long.

The SIGNAL unit 520 can further include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include a "coding" field indicating the type of encoding used. The "coding" field can be 1-bit long.

The SIGNAL unit 520 can further include an "AID" field indicating the air identification (AID) associated with the data unit 500. The "AID" field can be 12-bits long. The SIGNAL unit 520 can further include a "STBC" field indicating whether space-time block coding (STBC) is used. The "STBC" field can be 1-bit long. The SIGNAL unit 520 can further include a "smoothing" field indicating whether smoothing is recommended on channel estimation. The "smoothing" field can be 1-bit long.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

The SIGNAL unit 520 can further include one or more reserved bits. As shown in the implementation of Table 1, the SIGNAL unit 520 can include 1 reserved bit. As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, the SIGNAL unit 520 can include one or more of the fields shown below in Table 2. Although the fields are shown having a particular length, and in a particular order, in various embodiments, one or more fields may be rearranged, added, omitted, or may have a different length. In some embodiments, the SIGNAL unit 520 has all of the fields shown in Table 2. In some embodiments, the SIGNAL unit 520 has only the fields shown in Table 2. In some embodiments, the SIGNAL unit 520 has the fields shown in Table 2 in the order shown in Table 2. In some embodiments, at least a portion of the information of multiple fields shown in Table 2 is included in a single field. For example, the first and second fields of Table 2 may be collapsed into a single field including the information of both the first and second fields.

TABLE 2

| Field of SIG-A (64-Point FFT) | Bits |
| --- | --- |
| MCS | 4 |
| Num SS | 2 |
| SGI | 1 |
| Length | 12 |
| Aggregation | 1 |
| BW | 2 |
| Coding | 1 |
| AID | 13 |
| STBC | 1 |
| Beamformed | 1 |
| Reserved | 0 |
| CRC | 8 |
| Tail | 6 |
| Total | 52 |

In the aspect shown in Table 2, the SIGNAL unit 520 can include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "Num SS" field indicating the number of spatial streams used. The "Num SS" field can be 2-bits long. The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "length" field indicating length of the payload 530. The "length" field can be 12-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 4095 bytes. The SIGNAL unit 520 can further include an "aggregation" field indicating whether A-MPDU is being used. The "aggregation" field can be 1-bit long.

The SIGNAL unit 520 can further include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include a "coding" field indicating the type of encoding used. The "coding" field can be 1-bit long.

The SIGNAL unit 520 can further include an "AID" field indicating the air identification (AID) associated with the data unit 500. The "AID" field can be 13-bits long. In some embodiments, the "AID" field carries the AID for SU, whereas for MU, the first bit is reserved, the next 6 bits carry group identifier (GID), and the last 6 bits carry a number of space time streams ($N_{sts}$) for $2^{nd}$, $3^{rd}$ and $4^{th}$ users. In some embodiments, certain exceptional values of the "AID" field may be used to identify the specific content of the packet, for example, whether the packet is for multicast or broadcast. The SIGNAL unit 520 can further include a "STBC" field indicating whether space-time block coding (STBC) is used. The "STBC" field can be 1-bit long. The SIGNAL unit 520 can further include a "beamformed" field indicating whether a beamforming steering matrix is applied to the waveform in an SU transmission. The "beamformed" field can be 1-bit long.

The SIGNAL unit 520 can further include a "CRC" field indicating the result of a cyclic redundancy check (CRC) computed on one or more fields of the SIGNAL unit 520. The "CRC" field can be 8-bits or 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

The SIGNAL unit 520 can further include one or more reserved bits. The SIGNAL unit 520 can include, for example, 0 or 4 reserved bits. As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, for 32-point FFT signals, the data unit 500 can include a 360 μs preamble. The preamble can include a single 4-symbol STF 512, a single 2-symbol LTF 514, and a 3-symbol SIGNAL unit 520. The SIGNAL unit 520 can include one or more of the fields shown below in Table 3. Although the fields are shown having a particular length, and in a particular order, in various embodiments, one or more fields may be rearranged, added, omitted, or may have a different length. In some embodiments, the SIGNAL unit 520 has all of the fields shown in Table 3. In some embodiments, the SIGNAL unit 520 has only the fields shown in Table 3. In some embodiments, the SIGNAL unit 520 has the fields shown in Table 3 in the order shown in Table 3. In some embodiments, at least a portion of the information of multiple fields shown in Table 3 is included in a single field. For example, the first and second fields of Table 3 may be collapsed into a single field including the information of both the first and second fields.

TABLE 3

| Field of SIG-A (32-Point FFT) | Bits |
|---|---|
| MCS | 4 |
| Num SS | 2 |
| SGI | 1 |
| Length | 11 |
| Aggregation | 1 |
| Coding | 1 |
| STBC | 1 |
| Reserved | 5 |
| CRC | 4 |
| Tail | 6 |
| Total | 36 |

In the aspect shown in Table 3, the SIGNAL unit 520 can include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "Num SS" field indicating the number of spatial streams used. The "Num SS" field can be 2-bits long. The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "length" field indicating length of the payload 530. The "length" field can be 11-bit long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 4095 bytes. The SIGNAL unit 520 can further include an "aggregation" field indicating whether A-MPDU is being used. The "aggregation" field can be 1-bit long.

The SIGNAL unit 520 can further include a "coding" field indicating the type of encoding used. The "coding" field can be 1-bit long. The SIGNAL unit 520 can further include a "STBC" field indicating whether space-time block coding (STBC) is used. The "STBC" field can be 1-bit long.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

The SIGNAL unit 520 can further include one or more reserved bits. As shown in the implementation of Table 3, the SIGNAL unit 520 can include 5 reserved bits. As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In the implementation shown in Table 3, the SIGNAL unit 520 for a 32-point FFT can omit one or more fields used in the SIGNAL unit 520 for the 64-point FFT shown above in Table 1. For example, the "BW," "AID," and "smoothing" fields are omitted. In an embodiment, certain fields can be omitted because the receiving device may implicitly know the parameters indicated in those fields.

In various embodiments, symbols, fields, and/or data units can be repeated in order to increase the effective signal-to-noise ratio (SNR) of a transmission. For example, 32-point FFT transmissions can be repeated two times, three times, four times, eight times, etc. In an embodiment, repetition can be accomplished in conjunction with downclocking of the transmission.

In one embodiment, for 32-point FFT signals with a two-time repetition mode, the data unit 500 can include a 440 μs preamble. The preamble can include a single 4-symbol STF 512, a single 3-symbol LTF 514, and a 4-symbol SIGNAL unit 520. The SIGNAL unit 520 can include one or more of the fields shown below in Table 4. Although the fields are shown having a particular length, and in a particular order, in various embodiments, one or more fields may be rearranged, added, omitted, or may have a different length. In some embodiments, the SIGNAL unit 520 has all of the fields shown in Table 4. In some embodiments, the SIGNAL unit 520 has only the fields shown in Table 4. In some embodiments, the SIGNAL unit 520 has the fields shown in Table 4 in the order shown in Table 4. In some embodiments, at least a portion of the information of multiple fields shown in Table 4 is included in a single field. For example, the first and second fields of Table 4 may be collapsed into a single field including the information of both the first and second fields.

TABLE 4

| Field of SIG-A (32-Point FFT, 2x Repetition) | Bits |
| --- | --- |
| Length | 9 |
| Reserved | 8 |
| Parity | 1 |
| Tail | 6 |
| Total | 24 |

In the aspect shown in Table 4, the SIGNAL unit 520 can include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 4095 bytes.

The SIGNAL unit 520 can further include a "parity" field indicating the result of a parity calculated on one or more fields of the SIGNAL unit 520. The "parity" field can be 1-bit long. In an embodiment, another error-detection code can be used instead of, or in addition to, the parity bit. The SIGNAL unit 520 can further include a "tail" field used to reset the state of a convolution encoder and/or decoder. The "tail" field can be 6-bits long.

The SIGNAL unit 520 can further include one or more reserved bits. As shown in the implementation of Table 4, the SIGNAL unit 520 can include 8 reserved bits. As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In the implementation shown in Table 4, the SIGNAL unit 520 for a 32-point FFT can omit one or more fields used in the SIGNAL unit 520 for the 64-point FFT shown above in Table 1. For example, the "MCS," "Num SS," "SGI," "BW," "AID," "aggregation," "coding," and "STBC" fields are omitted. In an embodiment, certain fields can be omitted because the receiving device may implicitly know the parameters indicated in those fields.

In an embodiment, a single SIGNAL unit 520 format can be used for 32-point FFT in both non-repetition and two-time repetition modes. The single SIGNAL unit 520 can be included in a "combined" preamble. In an embodiment, the combined preamble can be 520 µs long. The preamble can include a single 4-symbol STF 512, a single 3-symbol LTF 514, and a 6-symbol SIGNAL unit 520. The SIGNAL unit 520 can include one or more of the fields shown below in Table 5. Although the fields are shown having a particular length, and in a particular order, in various embodiments, one or more fields may be rearranged, added, omitted, or may have a different length. In some embodiments, the SIGNAL unit 520 has all of the fields shown in Table 5. In some embodiments, the SIGNAL unit 520 has only the fields shown in Table 5. In some embodiments, the SIGNAL unit 520 has the fields shown in Table 5 in the order shown in Table 5. In some embodiments, at least a portion of the information of multiple fields shown in Table 5 is included in a single field. For example, the first and second fields of Table 5 may be collapsed into a single field including the information of both the first and second fields.

TABLE 5

| Field of SIG-A (32-Point FFT Combined) | Bits |
| --- | --- |
| MCS | 4 |
| Num SS | 2 |
| SGI | 1 |
| Length | 11 |
| Aggregation | 1 |
| Coding | 1 |
| STBC | 1 |
| Smoothing | 1 |
| Reserved | 4 |
| CRC | 4 |
| Tail | 6 |
| Total | 36 |

In the aspect shown in Table 5, the SIGNAL unit 520 can include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "Num SS" field indicating the number of spatial streams used. The "Num SS" field can be 2-bits long. The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "length" field indicating length of the payload 530. The "length" field can be 11-bit long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 4095 bytes. The SIGNAL unit 520 can further include an "aggregation" field indicating whether A-MPDU is being used. The "aggregation" field can be 1-bit long.

The SIGNAL unit 520 can further include a "coding" field indicating the type of encoding used. The "coding" field can be 1-bit long. The SIGNAL unit 520 can further include a "STBC" field indicating whether space-time block coding (STBC) is used. The "STBC" field can be 1-bit long. The SIGNAL unit 520 can further include a "smoothing" field indicating whether smoothing is recommended on channel estimation. The "smoothing" field can be 1-bit long.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

The SIGNAL unit 520 can further include one or more reserved bits. As shown in the implementation of Table 5, the SIGNAL unit 520 can include 4 reserved bits. As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In the implementation shown in Table 5, the SIGNAL unit 520 for a 32-point FFT can omit one or more fields used in the SIGNAL unit 520 for the 64-point FFT shown above in Table 1. For example, the "BW" and the "AID" fields are omitted. In an embodiment, certain fields can be omitted because the receiving device may implicitly know the parameters indicated in those fields.

In an embodiment, a single SIGNAL unit 520 format can be used for 32-point FFT in normal and 2× rep modes. The SIGNAL unit 520 can include one or more of the fields shown below in Table 6. Although the fields are shown having a particular length, and in a particular order, in various embodiments, one or more fields may be rearranged, added, omitted, or may have a different length. In some embodiments, the SIGNAL unit 520 has all of the fields shown in Table 6. In some embodiments, the SIGNAL unit 520 has only the fields shown in Table 6. In some embodiments, the SIGNAL unit 520 has the fields shown in Table 6 in the order shown in Table 6. In some embodiments, at least a portion of the information of multiple fields shown in Table 6 is included in a single field. For example, the first and second fields of Table 6 may be collapsed into a single field including the information of both the first and second fields.

TABLE 6

| Field of SIG-A (32-Point FFT normal and 2x repetition modes) | Bits |
|---|---|
| MCS | 4 |
| Num SS | 2 |
| SGI | 1 |
| Length | 11 |
| Aggregation | 1 |
| Coding | 1 |
| STBC | 1 |
| Beamformed | 1 |
| Reserved | 0 |
| CRC | 8 |
| Tail | 6 |
| Total | 36 |

In the aspect shown in Table 6, the SIGNAL unit 520 can include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "Num SS" field indicating the number of spatial streams used. The "Num SS" field can be 2-bits long. The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "length" field indicating length of the payload 530. The "length" field can be 11-bit long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 2047 bytes. The SIGNAL unit 520 can further include an "aggregation" field indicating whether A-MPDU is being used. The "aggregation" field can be 1-bit long.

The SIGNAL unit 520 can further include a "coding" field indicating the type of encoding used. The "coding" field can be 1-bit long. The SIGNAL unit 520 can further include a "STBC" field indicating whether space-time block coding (STBC) is used. The "STBC" field can be 1-bit long. The SIGNAL unit 520 can further include a "beamformed" field indicating whether a beamforming steering matrix is applied to the waveform in an SU transmission. The "beamformed" field can be 1-bit long.

The SIGNAL unit 520 can further include a "CRC" field indicating the result of a cyclic redundancy check (CRC) computed on one or more fields of the SIGNAL unit 520. The "CRC" field can be 4-bits or 8-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

The SIGNAL unit 520 can further include one or more reserved bits. The SIGNAL unit 520 can include, for example, 0 or 4 reserved bits. As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In the implementation shown in Table 6, the SIGNAL unit 520 for a 32-point FFT can omit one or more fields used in the SIGNAL unit 520 for the 64-point FFT shown above in Table 1. For example, the "BW" and the "AID" fields are omitted. In an embodiment, certain fields can be omitted because the receiving device may implicitly know the parameters indicated in those fields.

In an embodiment, a single SIGNAL unit 520 format can be used for a 64-point FFT SIG-B MU mode. The SIGNAL unit 520 can be sent for each user with precoding applied. The SIGNAL unit 520 can include one or more of the fields shown below in Table 7. Although the fields are shown having a particular length, and in a particular order, in various embodiments, one or more fields may be rearranged, added, omitted, or may have a different length. In some embodiments, the SIGNAL unit 520 has all of the fields shown in Table 7. In some embodiments, the SIGNAL unit 520 has only the fields shown in Table 7. In some embodiments, the SIGNAL unit 520 has the fields shown in Table 7 in the order shown in Table 7. In some embodiments, at least a portion of the information of multiple fields shown in Table 7 is included in a single field. For example, the first and second fields of Table 7 may be collapsed into a single field including the information of both the first and second fields.

TABLE 7

| Field of SIG-B (64-Point FFT MU mode) | Bits |
|---|---|
| MCS | 4 |
| Coding | 1 |
| Reserved | 11 |
| CRC | 4 |
| Tail | 6 |
| Total | 26 |

In the aspect shown in Table 7, the SIGNAL unit 520 can include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "coding" field indicating the type of encoding used. The "coding" field can be 1-bit long.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

The SIGNAL unit 520 can further include one or more reserved bits. The SIGNAL unit 520 can include, for example, 11 reserved bits. As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In the implementation shown in Table 7, the SIGNAL unit 520 for a 32-point FFT can omit one or more fields used in the SIGNAL unit 520 for the 64-point FFT shown above in Table 1. For example, the "BW" and the "AID" fields are omitted. In an embodiment, certain fields can be omitted because the receiving device may implicitly know the parameters indicated in those fields.

In an embodiment, for 2 MHz, 64-point FFT signals, the data unit 500 can support multiple users. The preamble can include a 2-symbol SIGNAL unit 520. The SIGNAL unit 520 can include one or more of the fields shown below in Table 8. Although the fields are shown having a particular length, and in a particular order, in various embodiments, one or more fields may be rearranged, added, omitted, or may have a different length. In some embodiments, the SIGNAL unit 520 has all of the fields shown in Table 8. In some embodiments, the SIGNAL unit 520 has only the fields shown in Table 8. In some embodiments, the SIGNAL unit 520 has the fields shown in Table 8 in the order shown in Table 8. In some embodiments, at least a portion of the information of multiple fields shown in Table 8 is included in a single field. For example, the first and second fields of Table 8 may be collapsed into a single field including the information of both the first and second fields.

TABLE 8

| Field of SIG-A (64-Point FFT) | Bits |
| --- | --- |
| BW | 2 |
| 1$^{st}$ Reserved | 1 |
| STBC | 1 |
| Num SS | 2 |
| AID/GID + Nsts | 12 |
| 2$^{nd}$ Reserved | 1 |
| SGI | 1 |
| Coding | 1 |
| MCS | 4 |
| Beamformed | 1 |
| Aggregation | 1 |
| Length | 12 |
| 3$^{rd}$ Reserved | 3 |

TABLE 8-continued

| Field of SIG-A (64-Point FFT) | Bits |
| --- | --- |
| CRC | 4 |
| Tail | 6 |
| Total | 52 |

In some embodiments, a first symbol of the SIGNAL unit 520 includes the "BW," "1$^{st}$ Reserved," "STBC," "Num SS," "AID/GID+Nsts," "2$^{nd}$ Reserved," "SGI," "Coding," "MCS," and "Beamformed," fields, and a second symbol of the SIGNAL unit 520 includes the "Aggregation," "Length," "3$^{rd}$ Reserved," "CRC," and "Tail" fields.

In the aspect shown in Table 8, the SIGNAL unit 520 can include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include a "1$^{st}$ Reserved" bit. The SIGNAL unit 520 can further include a "STBC" field indicating whether space-time block coding (STBC) is used. The "STBC" field can be 1-bit long.

The SIGNAL unit 520 can further include a "Num SS" field indicating the number of spatial streams used. The "Num SS" field can be 2-bits long. The SIGNAL unit 520 can further include an "AID/GID+Nsts" field indicating the air identification (AID) associated with the data unit 500. The "AID/GID+Nsts" field can be 12-bits long. In some embodiments, the "AID/GID+Nsts" field carries the AID for SU, whereas for MU, the first 6 bits carry GID, and the last 6 bits carry $N_{sts}$ for 2$^{nd}$, 3$^{rd}$ and 4$^{th}$ users. In some embodiments, certain exceptional values of the "AID/GID+Nsts" field may be used to identify the specific content of the packet, for example, whether the packet is for multicast or broadcast. During SU mode, the "AID" bits of the "AID/GID+Nsts" field can be used for embodiments which use cellular offload, so that other devices can save power during the transmissions. The SIGNAL unit 520 can further include a "2$^{nd}$ Reserved" bit.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "coding" field indicating the type of encoding used. The "coding" field can be 1-bit long. The SIGNAL unit 520 can further include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "beamformed" field indicating whether a beamforming steering matrix is applied to the waveform in an SU transmission. The "beamformed" field can be 1-bit long.

The SIGNAL unit 520 can further include an "aggregation" field indicating whether A-MPDU is being used. The "aggregation" field can be 1-bit long. The SIGNAL unit 520 can further include a "length" field indicating length of the payload 530. The "length" field can be 12-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 4095 bytes. The SIGNAL unit 520 can further include 3 "3$^{rd}$ Reserved" bits. In alternative embodiments, the "length" field is 9-bits long and the SIGNAL unit 520 includes 6 "3$^{rd}$ Reserved" bits.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, the reserved bits can be used to extend the preceding field. For example, in the example shown in Table 8, the "1$^{st}$ Reserved" bit may be used as a 3$^{rd}$ bit for the "BW" field, the "2$^{nd}$ Reserved bit may be used as a 13$^{th}$ bit for the "AID/GID+Nsts" field, and/or one or more of the "3$^{rd}$ Reserved" bits may be used as additional bits for the "Length" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, a single SIGNAL unit 520 format can be used for a 64-point FFT SIG-B MU mode. The SIGNAL unit 520 can include one or more of the fields shown below in Table 9. Although the fields are shown having a particular length, and in a particular order, in various embodiments, one or more fields may be rearranged, added, omitted, or may have a different length. In some embodiments, the SIGNAL unit 520 has all of the fields shown in Table 9. In some embodiments, the SIGNAL unit 520 has only the fields shown in Table 9. In some embodiments, the SIGNAL unit 520 has the fields shown in Table 9 in the order shown in Table 9. In some embodiments, at least a portion of the information of multiple fields shown in Table 9 is included in a single field. For example, the first and second fields of Table 9 may be collapsed into a single field including the information of both the first and second fields.

TABLE 9

| Field of SIG-B (64-Point FFT MU mode) | Bits |
| --- | --- |
| MCS | 4 |
| Coding | 1 |
| Reserved | 7 |
| CRC | 8 |
| Tail | 6 |
| Total | 26 |

In the aspect shown in Table 9, the SIGNAL unit 520 can include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "coding" field indicating the type of encoding used. The "coding" field can be 1-bit long.

The SIGNAL unit 520 can further include 7 reserved bits. The SIGNAL unit 520 can further include a "CRC" field indicating the result of a cyclic redundancy check (CRC) computed on one or more fields of the SIGNAL unit 520. The "CRC" field can be 8-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, for a 1 MHz SIG-A packet, the SIGNAL unit 520 can include one or more of the fields shown below in Table 10. Although the fields are shown having a particular length, and in a particular order, in various embodiments, one or more fields may be rearranged, added, omitted, or may have a different length. In some embodiments, the SIGNAL unit 520 has all of the fields shown in Table 10. In some embodiments, the SIGNAL unit 520 has only the fields shown in Table 10. In some embodiments, the SIGNAL unit 520 has the fields shown in Table 10 in the order shown in Table 10. In some embodiments, at least a portion of the information of multiple fields shown in Table 10 is included in a single field. For example, the first and second fields of Table 10 may be collapsed into a single field including the information of both the first and second fields.

TABLE 10

| Field of SIG-A (1 MHz 6 symbols) | Bits |
| --- | --- |
| STBC | 1 |
| Num SS | 2 |
| SGI | 1 |
| Coding | 1 |
| Beamformed | 1 |
| MCS | 4 |
| Aggregation | 1 |
| Length | 11 |
| Reserved | 4 |
| CRC | 4 |
| Tail | 6 |
| Total | 36 |

In the aspect shown in Table 10, the SIGNAL unit 520 can include a "STBC" field indicating whether space-time block coding (STBC) is used. The "STBC" field can be 1-bit long. The SIGNAL unit 520 can further include a "Num SS" field indicating the number of spatial streams used. The "Num SS" field can be 2-bits long.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "coding" field indicating the type of encoding used. The "coding" field can be 1-bit long. The SIGNAL unit 520 can further include a "beamformed" field indicating whether a beamforming steering matrix is applied to the waveform in an SU transmission. The "beamformed" field can be 1-bit long.

The SIGNAL unit 520 can further include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include an "aggregation" field indicating whether A-MPDU is being used. The "aggregation" field can be 1-bit long.

The SIGNAL unit 520 can further include a "length" field indicating length of the payload 530. The "length" field can be 11-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 2047 bytes.

The SIGNAL unit 520 can further include 4 reserved bits. The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, the reserved bits can be used to extend the preceding field. For example, in the example shown in Table 10, the reserved bits may be used as additional bits for the "Length" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, for a 1 MHz SIG-A packet, the SIGNAL unit 520 can include one or more of the fields shown below in Table 11. Although the fields are shown having a particular length, and in a particular order, in various embodiments, one or more fields may be rearranged, added, omitted, or may have a different length. In some embodiments, the SIGNAL unit 520 has all of the fields shown in Table 11. In some embodiments, the SIGNAL unit 520 has only the fields shown in Table 11. In some embodiments, the SIGNAL unit 520 has the fields shown in Table 11 in the order shown in Table 11. In some embodiments, at least a portion of the information of multiple fields shown in Table 11 is included in a single field. For example, the first and second fields of Table 11 may be collapsed into a single field including the information of both the first and second fields.

TABLE 11

| Field of SIG-A (1 MHz 5 symbols) | Bits |
| --- | --- |
| STBC | 1 |
| Num SS | 2 |
| SGI | 1 |
| Coding | 1 |
| Beamformed | 1 |
| MCS | 4 |
| Aggregation | 1 |
| Length | 9 |
| Reserved | 0 |
| CRC | 4 |
| Tail | 6 |
| Total | 30 |

In the aspect shown in Table 11, the SIGNAL unit 520 can include a "STBC" field indicating whether space-time block coding (STBC) is used. The "STBC" field can be 1-bit long. The SIGNAL unit 520 can further include a "Num SS" field indicating the number of spatial streams used. The "Num SS" field can be 2-bits long.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "coding" field indicating the type of encoding used. The "coding" field can be 1-bit long. The SIGNAL unit 520 can further include a "beamformed" field indicating whether a beamforming steering matrix is applied to the waveform in an SU transmission. The "beamformed" field can be 1-bit long.

The SIGNAL unit 520 can further include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include an "aggregation" field indicating whether A-MPDU is being used. The "aggregation" field can be 1-bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes.

The SIGNAL unit 520 can further include 0 reserved bits. The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, for a 1 MHz SIG-A packet, the SIGNAL unit 520 can include one or more of the fields shown below in Table 12. Although the fields are shown having a particular length, and in a particular order, in various embodiments, one or more fields may be rearranged, added, omitted, or may have a different length. In some embodiments, the SIGNAL unit 520 has all of the fields shown in Table 12. In some embodiments, the SIGNAL unit 520 has only the fields shown in Table 12. In some embodiments, the SIGNAL unit 520 has the fields shown in Table 12 in the order shown in Table 12. In some embodiments, at least a portion of the information of multiple fields shown in Table 12 is included in a single field. For example, the first and second fields of Table 12 may be collapsed into a single field including the information of both the first and second fields.

TABLE 12

| Field of SIG-A (1 MHz 5 symbols) | Bits |
| --- | --- |
| STBC | 1 |
| SGI | 1 |
| MCS | 4 |
| Coding | 1 |

TABLE 12-continued

| Field of SIG-A (1 MHz 5 symbols) | Bits |
|---|---|
| Aggregation | 1 |
| Length | 9 |
| Reserved | 3 |
| CRC | 4 |
| Tail | 6 |
| Total | 30 |

In the aspect shown in Table 12, the SIGNAL unit 520 can include a "STBC" field indicating whether space-time block coding (STBC) is used. The "STBC" field can be 1-bit long. The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "coding" field indicating the type of encoding used. The "coding" field can be 1-bit long.

The SIGNAL unit 520 can further include an "aggregation" field indicating whether A-MPDU is being used. The "aggregation" field can be 1-bit long. The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes.

The SIGNAL unit 520 can further include 3 reserved bits. The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, the reserved bits can be used to extend the preceding field. For example, in the example shown in Table 12, one or more of the reserved bits may be used as additional bits for the "Length" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, for a 1 MHz SIG-A packet, the SIGNAL unit 520 can include one or more of the fields shown below in Table 13. Although the fields are shown having a particular length, and in a particular order, in various embodiments, one or more fields may be rearranged, added, omitted, or may have a different length. In some embodiments, the SIGNAL unit 520 has all of the fields shown in Table 13. In some embodiments, the SIGNAL unit 520 has only the fields shown in Table 13. In some embodiments, the SIGNAL unit 520 has the fields shown in Table 13 in the order shown in Table 13. In some embodiments, at least a portion of the information of multiple fields shown in Table 13 is included in a single field. For example, the first and second fields of Table 13 may be collapsed into a single field including the information of both the first and second fields.

TABLE 13

| Field of SIG-A (1 MHz 6 symbols) | Bits |
|---|---|
| STBC | 1 |
| SGI | 1 |
| MCS | 4 |
| Aggregation | 1 |
| Length | 9 |
| Reserved | 1 |
| Parity | 1 |
| Tail | 6 |
| Total | 24 |

In the aspect shown in Table 13, the SIGNAL unit 520 can include a "STBC" field indicating whether space-time block coding (STBC) is used. The "STBC" field can be 1-bit long. The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include an "aggregation" field indicating whether A-MPDU is being used. The "aggregation" field can be 1-bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes.

The SIGNAL unit 520 can further include 1 reserved bit. The SIGNAL unit 520 can further include a "parity" field indicating the result of a parity calculated on one or more fields of the SIGNAL unit 520. The "parity" field can be 1-bit long. In an embodiment, another error-detection code can be used instead of, or in addition to, the parity bit. The SIGNAL unit 520 can further include a "tail" field used to reset the state of a convolution encoder and/or decoder. The "tail" field can be 6-bits long.

As discussed below, in various embodiments, the reserved bit can be used to carry additional information for different packet types. For example, the reserved bit can include additional information related to acknowledgement (ACK) packets. In some embodiments, the reserved bit can be used to extend the preceding field. For example, in the example shown in Table 13, the reserved bit may be used as an additional bit for the "Length" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, a single SIGNAL unit 520 format can be used for a 64-point FFT SIG-B MU mode. The SIGNAL unit 520 can include one or more of the fields shown below in Table 14. Although the fields are shown having a particular length, and in a particular order, in various embodiments, one or more fields may be rearranged, added, omitted, or may have a different length. In some embodiments, the SIGNAL unit 520 has all of the fields shown in Table 14. In some embodiments, the SIGNAL unit 520 has only the fields shown in Table 14. In some embodiments, the SIGNAL unit 520 has the fields shown in Table 14 in the order shown in Table 14. In some embodiments, at least a portion of the information of multiple fields shown in Table 14 is included in a single field. For example, the first and second fields of Table 14 may be collapsed into a single field including the information of both the first and second fields.

TABLE 14

| Field of SIG-B (64-Point FFT MU mode) | Bits |
|---|---|
| MCS | 4 |
| Coding | 1 |
| Length | 9-11 |
| Reserved | 0-2 |
| CRC | 4 |
| Tail | 6 |
| Total | 26 |

In the aspect shown in Table 14, the SIGNAL unit 520 can include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include a "coding" field indicating the type of encoding used. The "coding" field can be 1-bit long.

The SIGNAL unit 520 can further include a "length" field indicating length of the payload 530. The "length" field can be 9-11 bits long. In an embodiment, the "length" field can indicate the length of the payload 530 in units of symbols when A-MPDU is being used. The "length" field can indicate the length of the payload 530 in units of bytes when A-MPDU is not being used. The SIGNAL unit 520 can further include 0-2 reserved bits. In an embodiment the total of the bits used for the Length field and the reserved bits is 11. In such embodiments, the reserved bits can be used to extend the preceding field. For example, in the example shown in Table 14, the reserved bits may be used as additional bits for the "Length" field.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, for 2 MHz, 64-point FFT signals, the data unit 500 can support multiple users. The preamble can include a 2-symbol SIGNAL unit 520. The SIGNAL unit 520 can include one or more of the fields shown below in Table 15. Although the fields are shown having a particular length, and in a particular order, in various embodiments, one or more fields may be rearranged, added, omitted, or may have a different length. In some embodiments, the SIGNAL unit 520 has all of the fields shown in Table 15. In some embodiments, the SIGNAL unit 520 has only the fields shown in Table 15. In some embodiments, the SIGNAL unit 520 has the fields shown in Table 15 in the order shown in Table 15. In some embodiments, at least a portion of the information of multiple fields shown in Table 15 is included in a single field. For example, the first and second fields of Table 15 may be collapsed into a single field including the information of both the first and second fields.

TABLE 15

| Field of SIG-A (64-Point FFT) | Bits |
|---|---|
| BW | 2 |
| $1^{st}$ Reserved | 1 |
| STBC | 1 |
| Num SS | 2 |
| AID/GID + Nsts | 12 |
| $2^{nd}$ Reserved | 1 |
| SGI | 1 |
| Coding | 2 |
| MCS | 4 |
| Beamformed | 1 |
| Aggregation | 1 |
| Length | 9 |
| $3^{rd}$ Reserved | 5 |
| CRC | 4 |
| Tail | 6 |
| Total | 52 |

In some embodiments, a first symbol of the SIGNAL unit 520 includes the "BW," "$1^{st}$ Reserved," "STBC," "Num SS," "AID/GID+Nsts," "$2^{nd}$ Reserved," "SGI," "Coding," and "MCS," fields, and a second symbol of the SIGNAL unit 520 includes the "Beamformed," "Aggregation," "Length," "$3^{rd}$ Reserved," "CRC," and "Tail" fields.

In the aspect shown in Table 15, the SIGNAL unit 520 can include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include a "$1^{st}$ Reserved" bit. The SIGNAL unit 520 can further include a "STBC" field indicating whether space-time block coding (STBC) is used. The "STBC" field can be 1-bit long.

The SIGNAL unit 520 can further include a "Num SS" field indicating the number of spatial streams used. The "Num SS" field can be 2-bits long. The SIGNAL unit 520 can further include an "AID/GID+Nsts" field indicating the air identification (AID) associated with the data unit 500. The "AID/GID+Nsts" field can be 12-bits long and may include a PAID field as discussed above. In some embodiments, the "AID/GID+Nsts" field carries the AID for SU, whereas for MU, the first 6 bits carry GID, and the last 6 bits carry $N_{sts}$ for $2^{nd}$, $3^{rd}$ and $4^{th}$ users. In some embodiments, certain exceptional values of the "AID/GID+Nsts" field may be used to identify the specific content of the packet, for example, whether the packet is for multicast or broadcast. During SU mode, the "AID" bits of the "AID/GID+Nsts" field can be used for embodiments which use cellular offload, so that other devices can save power during the transmissions. The SIGNAL unit 520 can further include a "$2^{nd}$ Reserved" bit.

The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "coding" field indicating the type of encoding used. The "coding" field can be 2-bit long. The first bit of the "coding" field can indicate coding type for a single user, or for user 0 if multi-user. The second bit of the "coding" field can be used to indicate whether LDPC encoding resulted in an extra symbol. If multi-user, the second bit of the "coding" field can be used to indicate whether low-density parity-check (LDPC) encoding resulted in an extra symbol for any of the users. The SIGNAL unit 520 can further include an "MCS" field indicating the modulation coding scheme (MCS) used. The "MCS" field can be 4-bits long. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used.

The SIGNAL unit 520 can further include a "beamformed" field indicating whether a beamforming steering matrix is applied to the waveform in an SU transmission. The "beamformed" field can be 1-bit long. The SIGNAL unit 520 can further include an "aggregation" field indicating whether A-MPDU is being used. The "aggregation" field can be 1-bit long. The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include 5 "$3^{rd}$ Reserved" bits.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, the reserved bits can be used to extend the preceding field. For example, in the example shown in Table 14, the "$1^{st}$ Reserved" bit may be used as a $3^{rd}$ bit for the "BW" field, the "$2^{nd}$ Reserved bit may be used as a $13^{th}$ bit for the "AID/GID+Nsts" field, and/or one or more of the "$3^{rd}$ Reserved" bits may be used as additional bits for the "Length" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, a single SIGNAL unit 520 format can be used for a 64-point FFT SIG-B MU mode. The SIGNAL unit 520 can be sent for each user with precoding applied. The SIGNAL unit 520 can include one or more of the fields shown below in Table 16. Although the fields are shown having a particular length, and in a particular order, in various embodiments, one or more fields may be rearranged, added, omitted, or may have a different length. In some embodiments, the SIGNAL unit 520 has all of the fields shown in Table 16. In some embodiments, the SIGNAL unit 520 has only the fields shown in Table 16. In some embodiments, the SIGNAL unit 520 has the fields shown in Table 16 in the order shown in Table 16. In some embodiments, at least a portion of the information of multiple fields shown in Table 16 is included in a single field. For example, the first and second fields of Table 16 may be collapsed into a single field including the information of both the first and second fields.

TABLE 16

| Field of SIG-B (64-Point FFT MU mode) | Bits |
| --- | --- |
| MCS | 4 |
| Reserved | 8 |
| CRC | 8 |
| Tail | 6 |
| Total | 26 |

In the aspect shown in Table 16, the SIGNAL unit 520 can include an "MCS" field indicating the modulation coding scheme (MCS) used. The "MCS" field can be 4-bits long. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used.

The SIGNAL unit 520 can further include a "CRC" field indicating the result of a cyclic redundancy check (CRC) computed on one or more fields of the SIGNAL unit 520. The "CRC" field can be 8-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

The SIGNAL unit 520 can further include one or more reserved bits. The SIGNAL unit 520 can include, for example, 8 reserved bits. As discussed below, in various embodiments, the reserved bits can be used to carry additional information for different packet types. For example, the reserved bits can include additional information related to acknowledgement (ACK) packets. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In the implementation shown in Table 16, the SIGNAL unit 520 for a 32-point FFT can omit one or more fields used in the SIGNAL unit 520 for the 64-point FFT shown above in Table 1. For example, the "BW" and the "AID" fields are omitted. In an embodiment, certain fields can be omitted because the receiving device may implicitly know the parameters indicated in those fields.

In an embodiment, for a 1 MHz SIG-A packet, the SIGNAL unit 520 can include one or more of the fields shown below in Table 17. Although the fields are shown having a particular length, and in a particular order, in various embodiments, one or more fields may be rearranged, added, omitted, or may have a different length. In some embodiments, the SIGNAL unit 520 has all of the fields shown in Table 17. In some embodiments, the SIGNAL unit 520 has only the fields shown in Table 17. In some embodiments, the SIGNAL unit 520 has the fields shown in Table 17 in the order shown in Table 17. In some embodiments, at least a portion of the information of multiple fields shown in Table 17 is included in a single field. For example, the first and second fields of Table 17 may be collapsed into a single field including the information of both the first and second fields.

TABLE 17

| Field of SIG-A (1 MHz 6 symbols) | Bits |
|---|---|
| STBC | 1 |
| Num SS | 2 |
| SGI | 1 |
| Coding | 2 |
| Beamformed | 1 |
| MCS | 4 |
| Aggregation | 1 |
| Length | 9 |
| Reserved | 5 |
| CRC | 4 |
| Tail | 6 |
| Total | 36 |

In the aspect shown in Table 17, the SIGNAL unit 520 can include a "STBC" field indicating whether space-time block coding (STBC) is used. The "STBC" field can be 1-bit long. The SIGNAL unit 520 can further include a "Num SS" field indicating the number of spatial streams used. The "Num SS" field can be 2-bits long.

The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "coding" field indicating the type of encoding used. The "coding" field can be 2-bit long. The first bit of the "coding" field can indicate coding type for a single user, or for user 0 if multi-user. The second bit of the "coding" field can be used to indicate whether LDPC encoding resulted in an extra symbol. If multi-user, the second bit of the "coding" field can be used to indicate whether LDPC encoding resulted in an extra symbol for any of the users. The SIGNAL unit 520 can further include a "beamformed" field indicating whether a beamforming steering matrix is applied to the waveform in an SU transmission. The "beamformed" field can be 1-bit long.

The SIGNAL unit 520 can further include an "MCS" field indicating the modulation coding scheme (MCS) used. The "MCS" field can be 4-bits long. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include an "aggregation" field indicating whether A-MPDU is being used. The "aggregation" field can be 1-bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes.

The SIGNAL unit 520 can further include 5 reserved bits. The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, the reserved bits can be used to extend the preceding field. For example, in the example shown in Table 17, one or more of the reserved bits may be used as additional bits for the "Length" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, for a 1 MHz SIG-A packet, the SIGNAL unit 520 can include one or more of the fields shown below in Table 18. Although the fields are shown having a particular length, and in a particular order, in various embodiments, one or more fields may be rearranged, added, omitted, or may have a different length. In some embodiments, the SIGNAL unit 520 has all of the fields shown in Table 18. In some embodiments, the SIGNAL unit 520 has only the fields shown in Table 18. In some embodiments, the SIGNAL unit 520 has the fields shown in Table 18 in the order shown in Table 18. In some embodiments, at least a portion of the information of multiple fields shown in Table 18 is included in a single field. For example, the first and second fields of Table 18 may be collapsed into a single field including the information of both the first and second fields.

TABLE 18

| Field of SIG-A (1 MHz 8 symbols) | Bits |
|---|---|
| STBC | 1 |
| Num SS | 2 |
| SGI | 1 |
| Coding | 2 |
| Beamformed | 1 |
| MCS | 4 |
| Aggregation | 1 |
| AID | 9-13 |
| $1^{st}$ Reserved | 2-6 |
| Length | 9 |
| $2^{nd}$ Reserved | 2 |
| CRC | 4 |
| Tail | 6 |
| Total | 48 |

In the aspect shown in Table 18, the SIGNAL unit 520 can include a "STBC" field indicating whether space-time block coding (STBC) is used. The "STBC" field can be 1-bit long. The SIGNAL unit 520 can further include a "Num SS" field indicating the number of spatial streams used. The "Num SS" field can be 2-bits long.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "coding" field indicating the type of encoding used. The "coding" field can be 2-bit long. The first bit of the "coding" field can indicate coding type for a single user, or for user 0 if multi-user. The second bit of the "coding" field can be used to indicate whether LDPC encoding resulted in an extra symbol. If multi-user, the second bit of the "coding" field can be used to indicate whether LDPC encoding resulted in an extra symbol for any of the users. The SIGNAL unit 520 can further include a "beamformed" field indicating whether a beamforming steering matrix is applied to the waveform in an SU transmission. The "beamformed" field can be 1-bit long.

The SIGNAL unit 520 can further include an "MCS" field indicating the modulation coding scheme (MCS) used. The "MCS" field can be 4-bits long. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include an "aggregation" field indicating whether A-MPDU is being used. The "aggregation" field can be 1-bit long.

The SIGNAL unit 520 can further include an "AID" field indicating the air identification (AID) associated with the data unit 500. The "AID" field can be from 9 to 13-bits long and may include a PAID field as discussed above. The SIGNAL unit 520 can further include from 2 to 6 $1^{st}$ reserved bits. The total of the bits for the "AID" field and the $1^{st}$ reserved bits may be 15. The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes.

The SIGNAL unit 520 can further include 2 $2^{nd}$ reserved bits. The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, the reserved bits can be used to extend the preceding field. For example, in the example shown in Table 18, one or more of the $1^{st}$ reserved bits may be used as additional bits for the "AID" field, and one or more of the $2^{nd}$ reserved bits may be used as additional bits for the "Length" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, for a 1 MHz SIG-A packet, the SIGNAL unit 520 can include one or more of the fields shown below in Table 19. Although the fields are shown having a particular length, and in a particular order, in various embodiments, one or more fields may be rearranged, added, omitted, or may have a different length. In some embodiments, the SIGNAL unit 520 has all of the fields shown in Table 19. In some embodiments, the SIGNAL unit 520 has only the fields shown in Table 19. In some embodiments, the SIGNAL unit 520 has the fields shown in Table 19 in the order shown in Table 19. In some embodiments, at least a portion of the information of multiple fields shown in Table 19 is included in a single field. For example, the first and second fields of Table 19 may be collapsed into a single field including the information of both the first and second fields.

TABLE 19

| Field of SIG-A (1 MHz 7 symbols) | Bits |
|---|---|
| STBC | 1 |
| Num SS | 2 |
| SGI | 1 |
| Coding | 2 |
| Beamformed | 1 |
| MCS | 4 |
| Aggregation | 1 |
| AID | 9 |
| Reserved | 2 |
| Length | 9 |
| CRC | 4 |
| Tail | 6 |
| Total | 42 |

In the aspect shown in Table 19, the SIGNAL unit 520 can include a "STBC" field indicating whether space-time block coding (STBC) is used. The "STBC" field can be 1-bit long. The SIGNAL unit 520 can further include a "Num SS" field indicating the number of spatial streams used. The "Num SS" field can be 2-bits long.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "coding" field indicating the type of encoding used. The "coding" field can be 2-bit long. The first bit of the "coding" field can indicate coding type for a single user, or for user 0 if multi-user. The second bit of the "coding" field can be used to indicate whether LDPC encoding resulted in an extra symbol. If multi-user, the second bit of the "coding" field can be used to indicate whether LDPC encoding resulted in an extra symbol for any of the users. The SIGNAL unit 520 can further include a "beamformed" field indicating whether a beamforming steering matrix is applied to the waveform in an SU transmission. The "beamformed" field can be 1-bit long.

The SIGNAL unit 520 can further include an "MCS" field indicating the modulation coding scheme (MCS) used. The "MCS" field can be 4-bits long. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include an "aggregation" field indicating whether A-MPDU is being used. The "aggregation" field can be 1-bit long.

The SIGNAL unit 520 can further include an "AID" field indicating the air identification (AID) associated with the data unit 500. The "AID" field can be 9-bits long and may include a PAID field as discussed above. The SIGNAL unit 520 can further include 2 reserved bits. The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

As discussed below, in various embodiments, the reserved bits can be used to carry additional information for different packet types. For example, the reserved bits can include additional information related to acknowledgement (ACK) packets. In some embodiments, the reserved bits can be used to extend the preceding field. For example, in the example shown in Table 19, one or more of the reserved bits may be used as additional bits for the "AID" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In an embodiment, for a 1 MHz SIG-A packet, the SIGNAL unit 520 can include one or more of the fields shown below in Table 20. Although the fields are shown having a particular length, and in a particular order, in various embodiments, one or more fields may be rearranged, added, omitted, or may have a different length. In some embodiments, the SIGNAL unit 520 has all of the fields shown in Table 20. In some embodiments, the SIGNAL unit 520 has only the fields shown in Table 20. In some embodiments, the SIGNAL unit 520 has the fields shown in Table 20 in the order shown in Table 20. In some embodiments, at least a portion of the information of multiple fields shown in Table 20 is included in a single field. For example, the first and second fields of Table 20 may be collapsed into a single field including the information of both the first and second fields.

TABLE 20

| Field of SIG-A (1 MHz 7 symbols) | Bits |
|---|---|
| STBC | 1 |
| Num SS | 2 |
| SGI | 1 |
| Coding | 2 |
| Beamformed | 1 |
| MCS | 4 |
| Aggregation | 1 |
| AID | 12 |
| 1st Reserved | 0-6 |
| Length | 9 |
| 2nd Reserved | 0-6 |
| CRC | 4 |
| Tail | 6 |
| Total | 43-49 |

In the aspect shown in Table 20, the SIGNAL unit 520 can include a "STBC" field indicating whether space-time block coding (STBC) is used. The "STBC" field can be 1-bit long. The SIGNAL unit 520 can further include a "Num SS" field indicating the number of spatial streams used. The "Num SS" field can be 2-bits long.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "coding" field indicating the type of encoding used. The "coding" field can be 2-bit long. The first bit of the "coding" field can indicate coding type for a single user, or for user 0 if multi-user. The second bit of the "coding" field can be used to indicate whether LDPC encoding resulted in an extra symbol. If multi-user, the second bit of the "coding" field can be used to indicate whether LDPC encoding resulted in an extra symbol for any of the users. The SIGNAL unit 520 can further include a "beamformed" field indicating whether a beamforming steering matrix is applied to the waveform in an SU transmission. The "beamformed" field can be 1-bit long.

The SIGNAL unit 520 can further include an "MCS" field indicating the modulation coding scheme (MCS) used. The "MCS" field can be 4-bits long. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include an "aggregation" field indicating whether A-MPDU is being used. The "aggregation" field can be 1-bit long.

The SIGNAL unit 520 can further include an "AID" field indicating the air identification (AID) associated with the data unit 500. The "AID" field can be 12-bits long and may include a PAID field as discussed above. The SIGNAL unit 520 can further include 0-6 $1^{st}$ reserved bits.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include 0-6 $2^{nd}$ reserved bits.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, for a 1 MHz SIG-A packet, the SIGNAL unit 520 can include one or more of the fields shown below in Table 21. Although the fields are shown having a particular length, and in a particular order, in various embodiments, one or more fields may be rearranged, added, omitted, or may have a different length. In some embodiments, the SIGNAL unit 520 has all of the fields shown in Table 21. In some embodiments, the SIGNAL unit 520 has only the fields shown in Table 21. In some embodiments, the SIGNAL unit 520 has the fields shown in Table 21 in the order shown in Table 21. In some embodiments, at least a portion of the information of multiple fields shown in Table 21 is included in a single field. For example, the first and second fields of Table 21 may be collapsed into a single field including the information of both the first and second fields.

TABLE 21

| Field of SIG-A (1 MHz 7 symbols) | Bits |
|---|---|
| STBC | 1 |
| Num SS | 2 |
| SGI | 1 |
| Coding | 1 |
| MCS | 4 |
| Aggregation | 1 |
| Length | 9 |
| Doppler/Reserved | 1 |
| CRC | 4 |
| Tail | 0 |
| Total | 24 |

In the aspect shown in Table 21, the SIGNAL unit 520 can include a "STBC" field indicating whether space-time block coding (STBC) is used. The "STBC" field can be 1-bit long. The SIGNAL unit 520 can further include a "Num SS" field indicating the number of spatial streams used. The "Num SS" field can be 2-bits long.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "coding" field indicating the type of encoding used. The "coding" field can be 1-bit long. The SIGNAL unit 520 can further include an "MCS" field indicating the modulation coding scheme (MCS) used. The "MCS" field can be 4-bits long. If multiuser, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include an "aggregation" field indicating whether A-MPDU is being used. The "aggregation" field can be 1-bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include a Doppler/reserved bit, which may be used as a reserved bit or as a Doppler mitigation bit to signal to the receiver that there are sections in SIGNAL unit 520 which can enable the receiver to mitigate the impact of 'high temporal channel variation' during transmission of the SIGNAL unit 520.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can omit a "tail" field used to reset the state of a convolution encoder and/or decoder, and for example, use tail biting, which is described more fully below.

In an embodiment, for a 2 MHz SIG packet with a short preamble, the SIGNAL unit 520 can include one or more of the fields shown below in Table 22. Although the fields are shown having a particular length, and in a particular order, in various embodiments, one or more fields may be rearranged, added, omitted, or may have a different length. In some embodiments, the SIGNAL unit 520 has all of the fields shown in Table 22. In some embodiments, the SIGNAL unit 520 has only the fields shown in Table 22. In some embodiments, the SIGNAL unit 520 has the fields shown in Table 22 in the order shown in Table 22. In some embodiments, at least a portion of the information of multiple fields shown in Table 22 is included in a single field. For example, the first and second fields of Table 22 may be collapsed into a single field including the information of both the first and second fields.

As discussed below, exceptional values in one or more of the fields shown in Table 22 may indicate that one or more fields of SIGNAL unit 520 should be interpreted differently. For example, when one field in the SIGNAL unit includes an exceptional state, one or more other fields of the SIGNAL unit 520 may include other information related to alternative frame type, such as an ACK frame, a beacon frame, a SYNC beacon frame, a link adaptation frame, etc. Other information can include synchronization information, beacon information, link adaptation information, acknowledgment information, etc. In general, a zero-length payload may be indicated by one or more fields in the SIGNAL unit 520 having an exceptional state.

In one embodiment, a value of all-zeros in the "length" field of the 2 MHz SIG packet may indicate that one or more of the reserved bits may indicate an alternative frame type. In another embodiment, a value of all-ones in the "MCS" field may indicate that the payload length is zero, and that one or more bits of the "length" field contains data related to an alternative frame type. In another embodiment, a non-zero value in one or more "reserved" bits may indicate that the payload length is zero, and that one or more bits of the "length" field contains data related to an alternative frame type. In some embodiments, exceptional values in the "length" field can indicate how the SIG field should be interpreted. In some embodiments, exceptional values in the "length" field can indicate the number of symbols of data following the PHY preamble, and optionally at what MCS the symbols are encoded. Exceptional values of the "length" field may include, for example, small lengths, such as 0, 1, 2, 3, or values less than, for example, 5 or 10.

TABLE 22

| Field of SIG (2 MHz 2 symbols) | Bits |
|---|---|
| Reserved | 1 |
| STBC | 1 |
| Reserved | 1 |
| BW | 2 |
| Nsts | 2 |
| PAID | 9 |
| SGI | 1 |
| Coding | 2 |
| MCS | 4 |
| Smoothing | 1 |
| Aggregation | 1 |
| Length | 9 |
| ACK Indication | 2 |
| Reserved | 2 |
| CRC | 4 |
| Tail | 6 |
| Total | 48 |

In the aspect shown in Table 22, the SIGNAL unit 520 can include a first "Reserved" field that may be one bit long. The SIGNAL unit 520 can further include an "STBC" field indicating whether space-time block coding (STBC) is used. The "STBC" field can be 1-bit long. The SIGNAL unit 520 can further include a second "Reserved" field that may be one bit in length.

The SIGNAL unit 520 can further include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include an "Nsts" field. The "Nsts" field may provide the number of space time streams (STS). The "Nsts" field may be two bits long.

The SIGNAL unit 520 can further include a "PAID" field indicating a partial association identifier associated with the data unit 500. The "PAID" field can be 9-bits long. The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "Coding" field indicating the type of encoding used. The "Coding" field can be 2-bit long. The SIGNAL unit 520 can further include an "MCS" field indicating the modulation coding scheme (MCS) used. The "MCS" field can be 4-bits long. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include a "Smoothing" field indicating whether smoothing is recommended on channel estimation. The "Smoothing" field can be one bit long. The SIGNAL unit 520 can further include an "aggregation" field indicating whether A-MPDU is being used. The "aggregation" field can be 1-bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include an "ACK Indication" field indicating whether the SIGNAL unit is an acknowledgment. In an embodiment, the "ACK Indication" field may indicate whether the SIGNAL unit 520 is an acknowledgement (0x00), a block acknowledgement (0x01), or not an acknowledgement (0x10). The value of (0x11) may be reserved. The "ACK Indication" field may be two bits in length. The SIGNAL unit may include a third "Reserved" field. The third "Reserved" field may be two bits in length.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, the first "Reserved" field, "STBC" field, second "Reserved" field, "BW" field, "Nsts" field, "PAID" field, "SGI" field, "Coding" field, "MCS" field, and the "Smoothing" field may be encoded using the first symbol of SIG-A. In an embodiment, the "Aggregation" field, "Length" field, "ACK Indication" field, third "Reserved" field, "CRC" field, and "Tail" field may be encoded using the second symbol of SIG-A.

In an embodiment, for a 2 MHz SIG-A packet with a long preamble and used for a single user, the SIGNAL unit 520 can include one or more of the fields shown below in Table 23. Although the fields are shown having a particular length, and in a particular order, in various embodiments, one or more fields may be rearranged, added, omitted, or may have a different length. In some embodiments, the SIGNAL unit 520 has all of the fields shown in Table 23. In some embodiments, the SIGNAL unit 520 has only the fields shown in Table 23. In some embodiments, the SIGNAL unit 520 has the fields shown in Table 23 in the order shown in Table 23. In some embodiments, at least a portion of the information of multiple fields shown in Table 23 is included in a single field. For example, the first and second fields of Table 23 may be collapsed into a single field including the information of both the first and second fields.

As discussed below, exceptional values in one or more of the fields shown in Table 23 may indicate that one or more fields of SIGNAL unit 520 should be interpreted differently. For example, when one field in the SIGNAL unit 520 includes an exceptional state, one or more other fields of the SIGNAL unit 520 may include other information related to alternative frame type, such as an ACK frame, a beacon frame, a SYNC beacon frame, a link adaptation frame, etc. Other information can include synchronization information, beacon information, link adaptation information, acknowledgment information, etc. In general, a zero-length payload may be indicated by one or more fields in the SIGNAL unit 520 having an exceptional state.

In one embodiment, a value of all-zeros in the "length" field of the 2 MHz SIG-A packet may indicate that one or more of the reserved bits may indicate an alternative frame type. In another embodiment, a value of all-ones in the "MCS" field may indicate that the payload length is zero, and that one or more bits of the "length" field contains data related to an alternative frame type. In another embodiment, a non-zero value in one or more "reserved" bits may indicate that the payload length is zero, and that one or more bits of the "length" field contains data related to an alternative frame type. In some embodiments, exceptional values in the "length" field can indicate how the SIG field should be interpreted. In some embodiments, exceptional values in the "length" field can indicate the number of symbols of data following the PHY preamble, and optionally at what MCS the symbols are encoded. Exceptional values of the "length" field may include, for example, small lengths, such as 0, 1, 2, 3, or values less than, for example, 5 or 10.

TABLE 23

| Field of SIG-A (2 MHz 2 symbols) | Bits |
| --- | --- |
| MU/SU | 1 |
| STBC | 1 |
| Reserved | 1 |
| BW | 2 |
| Nsts | 2 |
| PAID | 9 |
| SGI | 1 |
| Coding | 2 |
| MCS | 4 |
| Beam-Change Indication | 1 |
| Aggregation | 1 |
| Length | 9 |

TABLE 23-continued

| Field of SIG-A (2 MHz 2 symbols) | Bits |
|---|---|
| ACK Indication | 2 |
| Reserved | 2 |
| CRC | 4 |
| Tail | 6 |
| Total | 48 |

In the aspect shown in Table 23, the SIGNAL unit 520 can include a "MU/SU" field, indicating whether the SIGNAL unit is for a single user or multiple users. The "MU/SU" field may be one bit long. The "MU/SU" field may be set to zero for single user. The SIGNAL unit 520 can further include an "STBC" field indicating whether space-time block coding (STBC) is used. The "STBC" field can be 1-bit long. The SIGNAL unit 520 can further include a first "Reserved" field that may be one bit in length.

The SIGNAL unit 520 can further include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include an "Nsts" field. The "Nsts" field may provide the number of space time streams (STS). The "Nsts" field may be two bits long. The SIGNAL unit 520 can further include a "PAID" field indicating a partial association identifier associated with the data unit 500. The "PAID" field can be 9-bits long.

The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "coding" field indicating the type of encoding used. The "coding" field can be 2 bits long. In an embodiment, the first bit of the "Coding" field is the coding type for single user, while the second bit is the coding type for LDPC Nsym ambiguity. The SIGNAL unit 520 can further include an "MCS" field indicating the modulation coding scheme (MCS) used. The "MCS" field can be 4-bits long. The "MCS" field may indicate coding for single-user. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include a "Beam-change indication" field indicating if a quadrature component matrix (Q matrix) changes starting data STF (D-STF). The "Beam-Change Indication" field can be one bit long. The SIGNAL unit 520 can further include an "Aggregation" field indicating whether an A-MPDU is being used. The "Aggregation" field can be 1-bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include an "ACK Indication" field indicating whether the SIGNAL unit is an acknowledgment. In an embodiment, the "ACK Indication" field may indicate whether the SIGNAL unit 520 is an acknowledgement (0x00), a block acknowledgement (0x01), or not an acknowledgement (0x10). The value of (0x11) may be reserved. The "ACK Indication" field may be two bits in length. The SIGNAL unit may include a second "Reserved" field. The "Reserved" field may be two bits in length.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, the "MU/SU" field, "STBC" field, first "Reserved" field, "BW" field, "Nsts" field, "PAID" field, "SGI" field, "Coding" field, "MCS" field, and "Beam-Change Indication" field may be encoded using the first symbol of SIG-A. In an embodiment, the "Aggregation" field, "Length" field, "ACK Indication" field, second "Reserved" field, "CRC" field, and "Tail" field may be encoded using the second symbol of SIG-A.

In an embodiment, for a 2 MHz SIG-A packet with a long preamble and used for multi-user, the SIGNAL unit 520 can include one or more of the fields shown below in Table 24. Although the fields are shown having a particular length, and in a particular order, in various embodiments, one or more fields may be rearranged, added, omitted, or may have a different length. In some embodiments, the SIGNAL unit 520 has all of the fields shown in Table 24. In some embodiments, the SIGNAL unit 520 has only the fields shown in Table 24. In some embodiments, the SIGNAL unit 520 has the fields shown in Table 24 in the order shown in Table 24. In some embodiments, at least a portion of the information of multiple fields shown in Table 24 is included in a single field. For example, the first and second fields of Table 24 may be collapsed into a single field including the information of both the first and second fields.

As discussed below, exceptional values in one or more of the fields shown in Table 24 may indicate that one or more fields of SIGNAL unit 520 should be interpreted differently. For example, when one field in the SIGNAL unit includes an exceptional state, one or more other fields of the SIGNAL unit 520 may include other information related to alternative frame type, such as an ACK frame, a beacon frame, a SYNC beacon frame, a link adaptation frame, etc. Other information can include synchronization information, beacon information, link adaptation information, acknowledgment information, etc. In general, a zero-length payload may be indicated by one or more fields in the SIGNAL unit 520 having an exceptional state.

In one embodiment, a value of all-zeros in the "length" field of the 2 MHz SIG-A packet may indicate that one or more of the reserved bits may indicate an alternative frame type. In another embodiment, a value of all-ones in the "MCS" field may indicate that the payload length is zero, and that one or more bits of the "length" field contains data related to an alternative frame type. In another embodiment, a non-zero value in one or more "reserved" bits may indicate that the payload length is zero, and that one or more bits of the "length" field contains data related to an alternative frame type. In some embodiments, exceptional values in the "length" field can indicate how the SIG field should be interpreted. In some embodiments, exceptional values in the "length" field can indicate the number of symbols of data following the PHY preamble, and optionally at what MCS the symbols are encoded. Exceptional values of the "length" field may include, for example, small lengths, such as 0, 1, 2, 3, or values less than, for example, 5 or 10.

TABLE 24

| Field of SIG-A (2 MHz 2 symbols) | Bits |
|---|---|
| MU/SU | 1 |
| STBC | 1 |
| Reserved | 1 |
| BW | 2 |
| Nsts | 8 |
| GID | 6 |
| SGI | 1 |
| Coding - I | 4 |
| Coding - II | 1 |
| Beam-Change Indication | 1 |
| Length | 9 |
| ACK Indication | 2 |
| Reserved | 1 |
| CRC | 4 |
| Tail | 6 |
| Total | 48 |

In the aspect shown in Table 24, the SIGNAL unit 520 can include a "MU/SU" field, indicating whether the SIGNAL unit is for a single user or multiple users. The MU/SU" field may be one bit long. The "MU/SU" field may be set to one for multi user. The SIGNAL unit 520 can further include an "STBC" field indicating whether space-time block coding (STBC) is used. The "STBC" field can be 1-bit long. The SIGNAL unit 520 can further include a first "Reserved" field that may be one bit in length.

The SIGNAL unit 520 can further include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include an "Nsts" field. The "Nsts" field may provide the number of space time streams (STS). The "Nsts" field may be eight bits long. Two bits of the "Nsts" field may be provided per user for up to four users. The SIGNAL unit 520 can further include a "GID" field indicating a group identifier associated with the data unit 500. The "GID" field can be 6-bits long.

The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "Coding-I" field indicating the type of encoding used. The "Coding-I" field can be 4 bits long. Each bit may indicate a coding type for each of four users. The SIGNAL unit 520 can further include a "Coding-II" field, indicating LDPC Nsym ambiguity. The SIGNAL unit 520 can further include a "Beam-Change Indication" field indicating if a Q matrix changes starting D-STF. The "Beam-Change Indication" field can be one bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include an "ACK Indication" field indicating whether the SIGNAL unit is an acknowledgment. In an embodiment, the "ACK Indication" field may indicate whether the SIGNAL unit 520 is an acknowledgement (0x00), a block acknowledgement (0x01), or not an acknowledgement (0x10). The value of (0x11) may be reserved. The "ACK Indication" field may be two bits in length. The SIGNAL unit may include a second "Reserved" field. The "Reserved" field may be one bit in length.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, the "MU/SU" field, "STBC" field, first "Reserved" field, "BW" field, "Nsts" field, "GID" field, "SGI" field, and the "Coding-I" field may be encoded using the first symbol of SIG-A. In an embodiment, the "Coding-II" field, "Beam-Change Indication" field, "Length" field, "ACK Indication" field, second "Reserved" field, "CRC" field, and "Tail" field may be encoded using the second symbol of SIG-A.

In an embodiment, for a 1 MHz SIG packet, the SIGNAL unit 520 can include one or more of the fields shown below in Table 25. Although the fields are shown having a particular length, and in a particular order, in various embodiments, one or more fields may be rearranged, added, omitted, or may have a different length. In some embodiments, the SIGNAL unit 520 has all of the fields shown in Table 25. In some embodiments, the SIGNAL unit 520 has only the fields shown in Table 25. In some embodiments, the SIGNAL unit 520 has the fields shown in Table 25 in the order shown in Table 25. In some embodiments, at least a portion of the information of multiple fields shown in Table 25 is included in a single field. For example, the first and second fields of Table 25 may be collapsed into a single field including the information of both the first and second fields.

As discussed below, exceptional values in one or more of the fields shown in Table 25 may indicate that one or more fields of SIGNAL unit 520 should be interpreted differently. For example, when one field in the SIGNAL unit includes an exceptional state, one or more other fields of the SIGNAL unit 520 may include other information related to alternative frame type, such as an ACK frame, a beacon frame, a SYNC beacon frame, a link adaptation frame, etc. Other information can include synchronization information, beacon information, link adaptation information, acknowledgment information, etc. In general, a zero-length payload may be indicated by one or more fields in the SIGNAL unit 520 having an exceptional state.

In one embodiment, a value of all-zeros in the "length" field of the 1 MHz SIG packet may indicate that one or more of the reserved bits may indicate an alternative frame type. In another embodiment, a value of all-ones in the "MCS" field may indicate that the payload length is zero, and that one or more bits of the "length" field contains data related to an alternative frame type. In another embodiment, a non-zero value in one or more "reserved" bits may indicate that the payload length is zero, and that one or more bits of the "length" field contains data related to an alternative frame type. In some embodiments, exceptional values in the "length" field can indicate how the SIG field should be interpreted. In some embodiments, exceptional values in the "length" field can indicate the number of symbols of data following the PHY preamble, and optionally at what MCS the symbols are encoded. Exceptional values of the "length" field may include, for example, small lengths, such as 0, 1, 2, 3, or values less than, for example, 5 or 10.

TABLE 25

| Field of SIG (1 MHz 5 or 6 symbols) | Bits |
|---|---|
| Nsts | 2 |
| SGI | 1 |
| Coding | 2 |
| STBC | 1 |
| Reserved | 1 |
| MCS | 4 |
| Aggregation | 1 |
| Length | 9 |
| ACK Indication | 2 |
| Reserved | 3 |
| CRC | 4 |
| Tail | 6 |
| Total | 36 |

In the aspect shown in Table 25, the SIGNAL unit 520 can include an "Nsts" field. The "Nsts" field may provide the number of space time streams (STS). The "Nsts" field may be two bits long. The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "Coding" field indicating the type of encoding used. The "Coding" field can be 2 bits long. One bit may indicate a coding type (LDPC/BCC). The second bit may indicate LDPC $N_{sym}$ ambiguity. The SIGNAL unit 520 can further include an "STBC" field indicating whether space-time block coding (STBC) is used. The "STBC" field can be 1-bit long. The SIGNAL unit 520 can further include a first "Reserved" field that may be one bit in length.

The SIGNAL unit 520 can further include an "MCS" field indicating the modulation coding scheme (MCS) used. The "MCS" field can be 4-bits long. In an embodiment, the "MCS" field may indicate that, for example, quadrature phase-shift keying (QPSK) is used. The SIGNAL unit 520 can further include an "Aggregation" field indicating whether an A-MPDU is being used. The "Aggregation" field can be 1-bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include an "ACK Indication" field indicating whether the SIGNAL unit is an acknowledgment. In an embodiment, the "ACK Indication" field may indicate whether the SIGNAL unit 520 is an acknowledgement (0x00), a block acknowledgement (0x01), or not an acknowledgement (0x10). The value of (0x11) may be reserved. The "ACK Indication" field may be two bits in length. The SIGNAL unit may include a second "Reserved" field. The "Reserved" field may be three bits in length.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, one reserved bit is placed just after the first symbol. This may provision new PHY features. This provides a total of four (4) reserved bits.

In an embodiment, for a 2 MHz SIG packet with a short preamble, the SIGNAL unit 520 can include one or more of the fields shown below in Table 26. Although the fields are shown having a particular length, and in a particular order, in various embodiments, one or more fields may be rearranged, added, omitted, or may have a different length.

The ordering of the fields may affect the peak to average power ratio of receiving or transmitting or generating the packet. Therefore, in some embodiments, the ordering of the fields may be changed to reduce the peak to average power ratio experienced when receiving or transmitting or generating the packet. The peak to average power ratio for a packet with the fields and field order shown in Table 26 has been measured. The measurements show a peak to average power ratio of 11.59 decibels for the first symbol and 9.86 decibels for the second symbol when the reserved bits are set to one (1). When the reserved bits are set to zero, experimental results have shown a peak to average power ratio of 13.4845 decibels for the first symbol and 10.4742 decibels for the second symbol when the reserved bits are set to zero (0).

In some embodiments, the SIGNAL unit 520 has all of the fields shown in Table 26. In some embodiments, the SIGNAL unit 520 has only the fields shown in Table 26. In some embodiments, the SIGNAL unit 520 has the fields shown in Table 26 in the order shown in Table 26. In some embodiments, at least a portion of the information of multiple fields shown in Table 26 is included in a single field. For example, the first and second fields of Table 26 may be collapsed into a single field including the information of both the first and second fields.

As discussed below, exceptional values in one or more of the fields shown in Table 26 may indicate that one or more fields of SIGNAL unit 520 should be interpreted differently. For example, when one field in the SIGNAL unit includes an exceptional state, one or more other fields of the SIGNAL unit 520 may include other information related to alternative frame type, such as an ACK frame, a beacon frame, a SYNC beacon frame, a link adaptation frame, etc. Other information can include synchronization information, beacon information, link adaptation information, acknowledgment information, etc. In general, a zero-length payload may be indicated by one or more fields in the SIGNAL unit 520 having an exceptional state.

In one embodiment, a value of all-zeros in the "length" field of the 2 MHz SIG packet may indicate that one or more of the reserved bits may indicate an alternative frame type. In another embodiment, a value of all-ones in the "MCS" field may indicate that the payload length is zero, and that one or more bits of the "length" field contains data related to an alternative frame type. In another embodiment, a non-zero value in one or more "reserved" bits may indicate that the payload length is zero, and that one or more bits of the "length" field contains data related to an alternative frame type. In some embodiments, exceptional values in the "length" field can indicate how the SIG field should be interpreted. In some embodiments, exceptional values in the "length" field can indicate the number of symbols of data following the PHY preamble, and optionally at what MCS the symbols are encoded. Exceptional values of the "length" field may include, for example, small lengths, such as 0, 1, 2, 3, or values less than, for example, 5 or 10.

TABLE 26

| Field of SIG (2 MHz 2 symbols) | Bits |
|---|---|
| Reserved | 1 |
| STBC | 1 |
| Reserved | 1 |
| BW | 2 |
| Nsts | 2 |
| Length | 9 |
| SGI | 1 |
| Coding | 2 |
| MCS | 4 |
| Smoothing | 1 |
| Aggregation | 1 |
| PAID | 9 |
| ACK Indication | 2 |
| Reserved | 2 |
| CRC | 4 |
| Tail | 6 |
| Total | 48 |

In the aspect shown in Table 26, the SIGNAL unit 520 can include a first "Reserved" field that may be one bit long. The SIGNAL unit 520 can further include an "STBC" field indicating whether space-time block coding (STBC) is used. The "STBC" field can be 1-bit long. The SIGNAL unit 520 can further include a second "Reserved" field that may be one bit in length.

The SIGNAL unit 520 can further include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz.

The SIGNAL unit 520 can further include an "Nsts" field. The "Nsts" field may provide the number of space time streams (STS). The "Nsts" field may be two bits long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include an "SGI" field indicating the short guard interval (SGI) used. The "SGI" field can be 1-bit long. In some embodiments, a short guard interval may be 2 μs and a normal guard interval may be 8 μs. In some embodiments, a short guard interval may be 2 μs and a normal guard interval may be 4 μs.

The SIGNAL unit 520 can further include a "Coding" field indicating the type of encoding used. The "Coding" field can be 2-bit long. The SIGNAL unit 520 can further include an "MCS" field indicating the modulation coding scheme (MCS) used. The "MCS" field can be 4-bits long. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include a "Smoothing" field indicating whether smoothing is recommended on channel estimation. The "Smoothing" field can be one bit long. The SIGNAL unit 520 can further include an "aggregation" field indicating whether A-MPDU is being used. The "aggregation" field can be 1-bit long.

The SIGNAL unit 520 can further include a "PAID" field indicating a partial association identifier associated with the data unit 500. The "PAID" field can be 9-bits long. The SIGNAL unit 520 can further include an "ACK Indication" field indicating whether the SIGNAL unit is an acknowledgment. In an embodiment, the "ACK Indication" field may indicate whether the SIGNAL unit 520 is an acknowledgement (0x00), a block acknowledgement (0x01), or not an acknowledgement (0x10). The value of (0x11) may be reserved. The "ACK Indication" field may be two bits in length. The SIGNAL unit may include a third "Reserved" field. The third "Reserved" field may be two bits in length.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, the first "Reserved" field, "STBC" field, second "Reserved" field, "BW" field, "Nsts" field, "Length" field, "SGI" field, "Coding" field, "MCS" field, and the "Smoothing" field may be encoded using the first symbol of SIG-A. In an embodiment, the "Aggregation" field, "PAID" field, "ACK Indication" field, third "Reserved" field, "CRC" field, and "Tail" field may be encoded using the second symbol of SIG-A.

In an embodiment, one reserved bit is placed in the first symbol. This may provision new PHY features.

In an embodiment, generating or receiving a first symbol of a 2 MHz, short preamble SIG field with fields ordered as shown in Table 26 may provide a maximum peak to average power ratio (PAPR) of less than 7.1 decibels. This PAPR may be measured using open loop transmission, a 256 byte packet, aggregation off, the ACK Indication field set to ACK, one stream, MCS0 and MCS7. All combinations of the remaining unspecified fields may be considered when determining this PAPR. The CRC field uses the four least significant bits (LSB) of the regular 8-bit CRC field in 802.11n or 802.11ac. QBPSK modulation is used on both SIG symbols. 4× over-sampled IFFT is also used. The stated maximum PAPR value above was determined by measuring the PAPR over all combinations of the unspecified fields.

In an embodiment, for a 2 MHz SIG-A packet with a long preamble and used for a single user, the SIGNAL unit 520 can include one or more of the fields shown below in Table 27. Although the fields are shown having a particular length, and in a particular order, in various embodiments, one or more fields may be rearranged, added, omitted, or may have a different length.

The ordering of the fields may affect the peak to average power ratio of receiving or transmitting or generating the packet. Therefore, in some embodiments, the ordering of the fields may be changed to reduce the peak to average power ratio experienced when receiving or transmitting or generating the packet. The peak to average power ratio for a packet with the fields and field order shown in Table 27 has been measured. The measurements show a peak to average power ratio of 11.1304 decibels for the first symbol and 10.4442 decibels for the second symbol when the reserved bits are set to one (1). When the reserved bits are set to zero, experimental results have shown a peak to average power ratio of 13.4845 decibels for the first symbol and 8.8606 decibels for the second symbol when the reserved bits are set to zero (0).

In some embodiments, the SIGNAL unit 520 has all of the fields shown in Table 27. In some embodiments, the SIGNAL unit 520 has only the fields shown in Table 27. In some embodiments, the SIGNAL unit 520 has the fields shown in Table 27 in the order shown in Table 27. In some embodiments, at least a portion of the information of multiple fields shown in Table 27 is included in a single field. For example, the first and second fields of Table 27 may be collapsed into a single field including the information of both the first and second fields.

As discussed below, exceptional values in one or more of the fields shown in Table 27 may indicate that one or more fields of SIGNAL unit 520 should be interpreted differently. For example, when one field in the SIGNAL unit includes an exceptional state, one or more other fields of the SIGNAL unit 520 may include other information related to alternative frame type, such as an ACK frame, a beacon frame, a SYNC beacon frame, a link adaptation frame, etc. Other information can include synchronization information, beacon information, link adaptation information, acknowledgment information, etc. In general, a zero-length payload may be indicated by one or more fields in the SIGNAL unit 520 having an exceptional state.

In one embodiment, a value of all-zeros in the "length" field of the 2 MHz SIG-A packet may indicate that one or more of the reserved bits may indicate an alternative frame type. In another embodiment, a value of all-ones in the "MCS" field may indicate that the payload length is zero, and that one or more bits of the "length" field contains data related to an alternative frame type. In another embodiment, a non-zero value in one or more "reserved" bits may indicate that the payload length is zero, and that one or more bits of the "length" field contains data related to an alternative frame type. In some embodiments, exceptional values in the "length" field can indicate how the SIG field should be interpreted. In some embodiments, exceptional values in the "length" field can indicate the number of symbols of data following the PHY preamble, and optionally at what MCS the symbols are encoded. Exceptional values of the "length" field may include, for example, small lengths, such as 0, 1, 2, 3, or values less than, for example, 5 or 10.

TABLE 27

| Field of SIG-A (2 MHz 2 symbols) | Bits |
| --- | --- |
| MU/SU | 1 |
| STBC | 1 |
| Reserved | 1 |
| BW | 2 |
| Nsts | 2 |
| Length | 9 |
| SGI | 1 |
| Coding | 2 |
| MCS | 4 |
| Beam-Change Indication | 1 |
| Aggregation | 1 |
| PAID | 9 |
| ACK Indication | 2 |
| Reserved | 2 |
| CRC | 4 |
| Tail | 6 |
| Total | 48 |

In the aspect shown in Table 27, the SIGNAL unit 520 can include a "MU/SU" field, indicating whether the SIGNAL unit is for a single user or multiple users. The "MU/SU" field may be one bit long. The "MU/SU" field may be set to zero for single user. The SIGNAL unit 520 can further include an "STBC" field indicating whether space-time block coding (STBC) is used. The "STBC" field can be 1-bit long. The SIGNAL unit 520 can further include a first "Reserved" field that may be one bit in length.

The SIGNAL unit 520 can further include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include an "Nsts" field. The "Nsts" field may provide the number of space time streams (STS). The "Nsts" field may be two bits long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "coding" field indicating the type of encoding used. The "coding" field can be 2 bits long. In an embodiment, the first bit of the "Coding" field is the coding type for single user, while the second bit is the coding type for LDPC Nsym ambiguity. The SIGNAL unit 520 can further include an "MCS" field indicating the modulation coding scheme (MCS) used. The "MCS" field can be 4-bits long. The "MCS" field may indicate coding for single-user. If multi-user, some bits of the "MCS" field may be used to indicate coding for users 1-3. For example, the first, second, and third bits of the "MCS" field may be used to indicate coding for users 1, 2, and 3, respectively. In an embodiment, the "MCS" field may indicate that, for example, quadrature phase-shift keying (QPSK) is used. The SIGNAL unit 520 can further include a "Beam-change indication" field indicating if a Q matrix changes starting D-STF. The "Beam-Change Indication" field can be one bit long. The SIGNAL unit 520 can further include an "Aggregation" field indicating whether an A-MPDU is being used. The "Aggregation" field can be 1-bit long.

The SIGNAL unit 520 can further include a "PAID" field indicating a partial association identifier associated with the data unit 500. The "PAID" field can be 9-bits long.

The SIGNAL unit 520 can further include an "ACK Indication" field indicating whether the SIGNAL unit is an acknowledgment. In an embodiment, the "ACK Indication" field may indicate whether the SIGNAL unit 520 is an acknowledgement (0x00), a block acknowledgement (0x01), or not an acknowledgement (0x10). The value of (0x11) may be reserved. The "ACK Indication" field may be two bits in length. The SIGNAL unit may include a second "Reserved" field. The "Reserved" field may be two bits in length.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, the "MU/SU" field, "STBC" field, first "Reserved" field, "BW" field, "Nsts" field, "Length" field, "SGI" field, "Coding" field, "MCS" field, and "Beam-Change Indication" field may be encoded using the first symbol of SIG-A. In an embodiment, the "Aggregation" field, "PAID" field, "ACK Indication" field, second "Reserved" field, "CRC" field, and "Tail" field may be encoded using the second symbol of SIG-A.

In an embodiment, generating or receiving a first symbol of a 2 MHz long preamble single-user SIG-A field with fields ordered as described in Table 27 may result in a maximum peak to average power ratio that is lower than 8.7 decibels. This PAPR may be measured using single user BF transmission, a 256 byte packet, aggregation off, the ACK Indication field set to ACK, one stream, and MCS7. All combinations of the remaining unspecified fields may be considered when determining this PAPR. The CRC field uses the four least significant bits (LSB) of the regular 8-bit CRC field in 802.11n or 802.11ac. QBPSK modulation is used on both SIG symbols. 4× oversampled IFFT is also used. The maximum PAPR value above was determined by measuring the PAPR over all combinations of the unspecified fields.

In an embodiment, for a 2 MHz SIG-A packet with a long preamble and used for multi-user, the SIGNAL unit 520 can include one or more of the fields shown below in Table 28. Although the fields are shown having a particular length, and in a particular order, in various embodiments, one or more fields may be rearranged, added, omitted, or may have a different length. In some embodiments, the SIGNAL unit 520 has all of the fields shown in Table 28.

The ordering of the fields may affect the peak to average power ratio of receiving or transmitting or generating the packet. Therefore, in some embodiments, the ordering of the fields may be changed to reduce the peak to average power ratio experienced when receiving or transmitting or generating the packet. The peak to average power ratio for a packet with the fields and field order shown in Table 28 has been measured. The measurements show a peak to average power ratio of 11.8997 decibels for the first symbol and 11.014 decibels for the second symbol when the reserved bits are set to one (1). When the reserved bits are set to zero, experimental results have shown a peak to average power ratio of 10.6865 decibels for the first symbol and 11.8570 decibels for the second symbol when the reserved bits are set to zero (0).

In some embodiments, the SIGNAL unit 520 has only the fields shown in Table 28. In some embodiments, the SIGNAL unit 520 has the fields shown in Table 28 in the order shown in Table 28. In some embodiments, at least a portion of the information of multiple fields shown in Table 28 is included in a single field. For example, the first and second fields of Table 28 may be collapsed into a single field including the information of both the first and second fields.

As discussed below, exceptional values in one or more of the fields shown in Table 28 may indicate that one or more fields of SIGNAL unit 520 should be interpreted differently. For example, when one field in the SIGNAL unit includes an exceptional state, one or more other fields of the SIGNAL unit 520 may include other information related to alternative frame type, such as an ACK frame, a beacon frame, a SYNC beacon frame, a link adaptation frame, etc. Other information can include synchronization information, beacon information, link adaptation information, acknowledgment information, etc. In general, a zero-length payload may be indicated by one or more fields in the SIGNAL unit 520 having an exceptional state.

In one embodiment, a value of all-zeros in the "length" field of the 2 MHz SIG-A packet may indicate that one or more of the reserved bits may indicate an alternative frame type. In another embodiment, a value of all-ones in the "MCS" field may indicate that the payload length is zero, and that one or more bits of the "length" field contains data related to an alternative frame type. In another embodiment, a non-zero value in one or more "reserved" bits may indicate that the payload length is zero, and that one or more bits of the "length" field contains data related to an alternative frame type. In some embodiments, exceptional values in the "length" field can indicate how the SIG field should be interpreted. In some embodiments, exceptional values in the "length" field can indicate the number of symbols of data following the PHY preamble, and optionally at what MCS the symbols are encoded. Exceptional values of the "length" field may include, for example, small lengths, such as 0, 1, 2, 3, or values less than, for example, 5 or 10.

TABLE 28

| Field of SIG-A (2 MHz 2 symbols) | Bits |
|---|---|
| MU/SU | 1 |
| STBC | 1 |
| Reserved | 1 |
| Nsts | 8 |
| BW | 2 |
| GID | 6 |
| SGI | 1 |
| Coding - I | 4 |
| Coding - II | 1 |
| Beam-Change Indication | 1 |
| Length | 9 |
| Ack Indication | 2 |
| Reserved | 1 |
| CRC | 4 |
| Tail | 6 |
| Total | 48 |

In the aspect shown in Table 28, the SIGNAL unit 520 can include a "MU/SU" field, indicating whether the SIGNAL unit is for a single user or multiple users. The MU/SU" field may be one bit long. The "MU/SU" field may be set to one for multi user. The SIGNAL unit 520 can further include an "STBC" field indicating whether space-time block coding (STBC) is used. The "STBC" field can be 1-bit long. The SIGNAL unit 520 can further include a first "Reserved" field that may be one bit in length.

The SIGNAL unit 520 can further include an "Nsts" field. The "Nsts" field may provide the number of space time streams (STS). The "Nsts" field may be eight bits long. Two bits of the "Nsts" field may be provided per user for up to four users. The SIGNAL unit 520 can further include a "BW" field indicating the bandwidth (BW) used. The "BW" field can be 2-bits long. In various embodiments, the 2-bit "BW" field can indicate whether the bandwidth is 2 MHz, 4 MHz, 8 MHz, or 16 MHz. The SIGNAL unit 520 can further include a "GID" field indicating a group identifier associated with the data unit 500. The "GID" field can be 6-bits long.

The SIGNAL unit 520 can further include an "SGI" field indicating the short guard interval (SGI) used. The "SGI" field can be 1-bit long. In some embodiments, a short guard interval may be 2 µs and a normal guard interval may be 8 µs. In some embodiments, a short guard interval may be 2 µs and a normal guard interval may be 4 µs.

The SIGNAL unit 520 can further include a "Coding-I" field indicating the type of encoding used. The "Coding-I" field can be 4 bits long. Each bit may indicate a coding type for each of four users. The SIGNAL unit 520 can further include a "Coding-II" field, indicating LDPC Nsym ambiguity. The SIGNAL unit 520 can further include a "Beam-Change Indication" field indicating if a Q matrix changes starting D-STF. The "Beam-Change Indication" field can be one bit long.

The SIGNAL unit 520 can further include a "length" field indicating length of the payload 530. The "length" field can be 9-bits long. In an embodiment, the "length" field can indicate the length of the payload 530 in units of symbols when A-MPDU is being used. The "length" field can indicate the length of the payload 530 in units of bytes when A-MPDU is not being used. In an embodiment, A-MPDU is used for packed sizes greater than 511 bytes. The SIGNAL unit 520 can further include an "ACK Indication" field indicating whether the SIGNAL unit is an acknowledgment. In an embodiment, the "ACK Indication" field may indicate whether the SIGNAL unit 520 is an acknowledgement (0x00), a block acknowledgement (0x01), or not an acknowledgement (0x10). The value of (0x11) may be reserved. The "ACK Indication" field may be two bits in length. The SIGNAL unit may include a second "Reserved" field. The "Reserved" field may be one bit in length.

The SIGNAL unit 520 can further include a "CRC" field indicating the result of a cyclic redundancy check (CRC) computed on one or more fields of the SIGNAL unit 520. The "CRC" field can be 4-bits long. In an embodiment, another error-detection code can be used instead of, or in addition to, the CRC. The SIGNAL unit 520 can further include a "tail" field used to reset the state of a convolution encoder and/or decoder. The "tail" field can be 6-bits long.

In an embodiment, the "MU/SU" field, "STBC" field, first "Reserved" field, "BW" field, "Nsts" field, "GID" field, "SGI" field, and the "Coding-I" field may be encoded using the first symbol of SIG-A. In an embodiment, the "Coding-II" field, "Beam-Change Indication" field, "Length" field, "ACK Indication" field, second "Reserved" field, "CRC" field, and "Tail" field may be encoded using the second symbol of SIG-A.

In an embodiment, generating or receiving a second symbol of an 8 MHz long preamble multi-user SIG field with fields ordered as described in Table 28 may result in a maximum peak to average power ratio (PAPR) that is lower than 11.1 decibels. This PAPR may be measured using multi-user transmission with three users. The group ID is set to three (3). A 1500 byte packet is used, with the ACK Indication field is set to block ACK (BA), one stream per user, and MCS7. All combinations of the remaining unspecified fields may be considered when determining this maximum PAPR. The CRC field uses the four least significant bits (LSB) of the regular 8-bit CRC field in 802.11n or 802.11ac. QBPSK modulation is used on both SIG symbols. 4× oversampled IFFT is also used. The stated maximum PAPR value is determined by measuring the PAPR over all combinations of the unspecified fields.

Because each of the seven symbols of the SIGNAL unit 520 is represented by a BPSK constellation having a rotation state which is either on the real or on the imaginary axis, the rotation state of each of the symbols can communicate an additional bit of information. For example, if the first symbol is on the real axis, this may communicate that STBC is on. Any of the bits of the SIGNAL unit 520 may be communicated through symbol rotation state. In the example shown in Table 28, at least one bit is communicated through rotation state of one of the symbols. In some embodiments, up to six reserved bits may be communicated through symbol rotation state. The reserved bits communicated through symbol rotation state may be $1^{st}$ reserved bits, $2^{nd}$ reserved bits, or a combination of $1^{st}$ and $2^{nd}$ reserved bits. In some embodiments, for robustness a single bit may be communicated by the rotation state of multiple symbols.

As discussed below, in various embodiments, the reserved bits can be used to carry additional information for different packet types. For example, the reserved bits can include additional information related to acknowledgement (ACK) packets. In some embodiments, the reserved bits can be used to extend the preceding field. For example, in the example shown in Table 19, one or more of the reserved bits may be used as additional bits for the "AID" field. In some embodiments, one or more of the reserved bits are used as one or more Doppler mitigation bits to signal to the receiver that there are sections in SIGNAL unit 520 which can enable the receiver to mitigate the impact of 'high temporal channel variation' during transmission of the SIGNAL unit 520.

In various embodiments, one or more fields in the SIGNAL unit 520 can include one or more "exceptional" states or values. An exceptional state can include, for example, a field value that would not normally occur. For example, if the value of the "MCS" field can normally be either "00," "01," or "10," then the value of all-ones (e.g., "11") may be considered an exceptional state. As another example, a value of all-zeros in the "length" field may be an exceptional state. As another example, a non-zero value in any of the "reserved" bits may be an exceptional state.

Exceptional field states may indicate that one or more fields of the SIGNAL unit 520 should be interpreted differently. For example, when one field in the SIGNAL unit includes an exceptional state, one or more other fields of the SIGNAL unit 520 may include other information related to alternative frame type, such as an ACK frame, a beacon frame, a SYNC beacon frame, a link adaptation frame, etc. Other information can include synchronization information, beacon information, link adaptation information, acknowledgment information, etc. In general, a zero-length payload may be indicated by one or more fields in the SIGNAL unit 520 having an exceptional state.

In one embodiment, a value of all-zeros in the "length" field may indicate that one or more of the reserved bits may indicate an alternative frame type. In another embodiment, a value of all-ones in the "MCS" field may indicate that the payload length is zero, and that one or more bits of the "length" field contains data related to an alternative frame type. In another embodiment, a non-zero value in one or more "reserved" bits may indicate that the payload length is zero, and that one or more bits of the "length" field contains data related to an alternative frame type. In some embodiments, exceptional values in the "length" field can indicate how the SIG field should be interpreted. In some embodiments, exceptional values in the "length" field can indicate the number of symbols of data following the PHY preamble, and optionally at what MCS the symbols are encoded. Exceptional values of the "length" field may include, for example, small lengths, such as 0, 1, 2, 3, or values less than, for example, 5 or 10.

In some embodiments, an exceptional value in the "reserved" bits indicates whether an ACK packet follows the current frame. In some implementations, the "reserved" bits can indicate that the current frame is a control frame, and that the remaining bits are reserved for MAC indications, including length.

TABLE 29

SIG field for short format preamble, 2 MHz and higher

| Field of SIG (short format, 2 MHz+) | Bits | Description |
| --- | --- | --- |
| Reserved | 1 | |
| STBC | 1 | Alamouti like STBC on all or no streams |
| Reserved | 1 | |
| BW | 2 | Indicating BW mode (2, 4, 8, or 16) |
| Nsts | 2 | |

TABLE 29-continued

SIG field for short format preamble, 2 MHz and higher

| Field of SIG (short format, 2 MHz+) | Bits | Description |
|---|---|---|
| Length | 9 | Dual Interpretation based on Agg. bit |
| SGI | 1 | Short Guard Interval |
| Coding | 2 | $1^{st}$ bit for coding type, $2^{nd}$ bit for LDPC Nsym ambiguity |
| MCS | 4 | |
| Smoothing | 1 | Indicates Whether beamforming steering matrix applied to waveform |
| Aggregation bit | 1 | |
| PAID | 9 | |
| ACK Indication | 2 | 00 = Ack; 01 = BA; 10 = No Ack; 11 = reserved |
| Reserved | 2 | |
| CRC | 4 | |
| Tail | 6 | |
| Total | 48 | |

Table 29 illustrates an example of a SIG field that may be used in a short format preamble in bandwidth modes of 2 MHz or higher. The first ten fields of the SIG field (i.e., Reserved, STBC, Reserved, BW, Nsts, Length, SGI, Coding, MCS, and Smoothing) may be in a first symbol of the SIG field and the last six fields of the SIG field (i.e., Aggregation bit, PAID, ACK Indication, Reserved, CRC, and Tail) may be in a second symbol of the SIG field. In a particular embodiment, at least one reserved bit may be included in the first symbol of the SIG field to provision for a subsequently developed PHY feature.

TABLE 30

SIG-A field for long format preamble, 2 MHz and higher, SU

| Field of SIG-A (long format, 2 MHz+, SU) | Bits | Description |
|---|---|---|
| MU/SU bit | 1 | Set to 0 for SU |
| STBC | 1 | Alamouti like STBC on all or no streams |
| Reserved | 1 | |
| BW | 2 | Indicating BW mode (2, 4, 8, or 16) |
| Nsts | 2 | |
| Length | 9 | Dual Interpretation based on Agg. bit |
| SGI | 1 | Short Guard Interval |
| Coding | 2 | $1^{st}$ bit for coding type, $2^{nd}$ bit for LDPC Nsym ambiguity |
| MCS | 4 | |
| Beam-change indication bit | 1 | Whether Q matrix changes starting D-STF |
| Aggregation bit | 1 | |
| PAID | 9 | |
| ACK Indication | 2 | 00 = Ack; 01 = BA; 10 = No Ack; 11 = reserved |
| Reserved | 2 | |
| CRC | 4 | |
| Tail | 6 | |
| Total | 48 | |

Table 30 illustrates an example of a SIG-A field that may be used in a long format preamble in bandwidth modes of 2 MHz or higher for single user (SU) transmissions. The first ten fields of the SIG-A field (i.e., MU/SU bit, STBC, Reserved, BW, Nsts, Length, SGI, Coding, MCS, and Beam-change indication bit) may be in a first symbol of the SIG-A field and the last six fields of the SIG-A field (i.e., Aggregation bit, PAID, ACK Indication, Reserved, CRC, and Tail) may be in a second symbol of the SIG-A field.

TABLE 31

SIG-A field for long format preamble, 2 MHz and higher, MU

| Field of SIG-A (long format, 2 MHz+, MU) | Bits | Description |
|---|---|---|
| MU/SU bit | 1 | Set to 1 for MU |
| STBC | 1 | Alamouti like STBC on all or no streams |
| Reserved | 1 | |
| Nsts | 8 | 2 bits per use for each of 4 users |
| BW | 2 | Indicating BW mode (2, 4, 8, or 16) |
| GID | 6 | |
| SGI | 1 | Short Guard Interval |
| Coding - I | 4 | Coding type for each of 4 users |
| Coding - II | 1 | For LDPC Nsym ambiguity |
| Reserved | 1 | |
| Length | 9 | Interpreted as number of symbols in MU case |
| ACK Indication | 2 | 00 = Ack; 01 = BA; 10 = No Ack; 11 = reserved |
| Reserved | 1 | |
| CRC | 4 | |
| Tail | 6 | |
| Total | 48 | |

Table 31 illustrates an example of a SIG-A field that may be used in a long format preamble in bandwidth modes of 2 MHz or higher for multi user (MU) transmissions (e.g., for up to four users). The first eight fields of the SIG-A field (i.e., MU/SU bit, STBC, Reserved, Nsts, BW, GID, SGI, and Coding-I) may be in a first symbol of the SIG-A field and the last seven fields of the SIG-A field (i.e., Coding-II, Reserved, Length, ACK Indication, Reserved, CRC, and Tail) may be in a second symbol of the SIG-A field. It will be noted that the order of the Nsts and BW fields may be reversed as compared to the SU SIG-A field shown in Table 30. This reversal may lead to improved peak to average power ratio (PAPR) for the MU SIG-A field shown in Table 31.

TABLE 32

SIG field for 1 MHz mode

| Field of SIG (1 MHz) | Bits | Description |
|---|---|---|
| Nsts | 2 | Number of space time streams |
| SGI | 1 | Short Guard Interval |
| Coding | 2 | $1^{st}$ bit for coding type (LDPC/BCC), $2^{nd}$ bit for LDPC Nsym ambig. |
| STBC | 1 | |
| Reserved | 1 | |
| MCS | 4 | |
| Aggregation Bit | 1 | Whether A-MPDUs are in use |
| Length | 9 | Dual interpretation based on Agg. bit |
| ACK Indication | 2 | 00 = Ack; 01 = BA; 10 = No Ack; 11 = reserved |
| Reserved | 3 | |
| CRC | 4 | |
| Tail | 6 | |
| Total | 36 | |

Table 32 illustrates an example of a SIG field that may be used in 1 MHz transmissions. In a particular embodiment, the SIG field of Table 32 occupies six symbols (36 bits with 6 bits/symbol at 1 MHz bandwidth).

Figure 6:
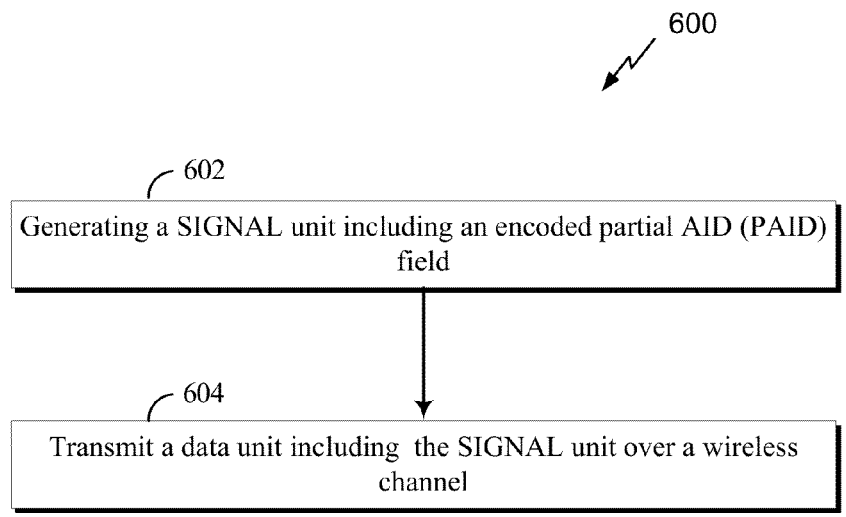
FIG. 6 shows a flow chart of an aspect of an exemplary method for generating and transmitting a data unit.

FIG. 6 shows a flow chart of an aspect of an exemplary method 600 of generating and transmitting a data unit. The method 600 may be used to generate any of the data units and SIGNAL units described above. The data units may be generated at either an AP or a STA and transmitted to another device in the wireless network. Although the method 600 is described below with respect to elements of the wireless device 202a (FIG. 3), those having ordinary skill in the art will appreciate that other components may be used to implement one or more of the steps described herein. Although steps may be described as occurring in a certain order, the steps can be reordered, steps can be omitted, and/or additional steps can be added.

At 602, the processor 204 generates a SIGNAL unit 520. The SIGNAL unit 520 includes at least an encoded PAID field. The PAID field has a value indicating that a portion of the signal unit is to be decoded by one or more devices which receive the signal unit, and the value of the PAID field indicates that the portion of the signal unit is not to be decoded by one or more other devices which receive the signal unit. In an embodiment, the modulator 302 may modulate a transmission that includes the SIGNAL unit 520, and the transform module 304 may translate tones corresponding to the transmission into the time domain. Advancing to 604, the transmitter 210 transmits a data unit including the SIGNAL unit over a wireless channel.

Figure 7:
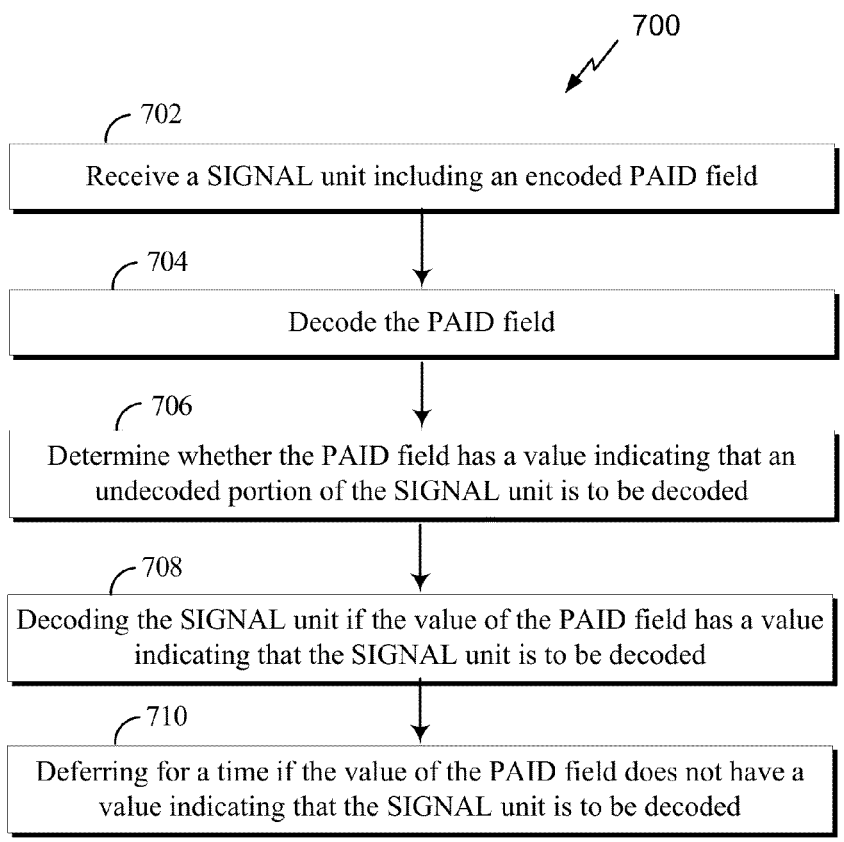
FIG. 7 shows a flow chart of another aspect of an exemplary method for receiving and processing a data unit including a signal unit.

FIG. 7 shows a flow chart of another aspect of an exemplary method 700 of receiving and processing a data unit including a SIGNAL unit 520. The method 700 may be used to receive any of the data units described above. The packets may be received at either an AP or a STA from another device in the wireless network. Although the method 700 is described below with respect to elements of the wireless device 202b (FIG. 4), those having ordinary skill in the art will appreciate that other components may be used to implement one or more of the steps described herein. Although steps may be described as occurring in a certain order, the steps can be reordered, steps can be omitted, and/or additional steps can be added.

At 702, the receiver 212 receives a SIGNAL unit 520. The SIGNAL unit 520 includes at least an encoded PAID field. For example, the SIGNAL unit 520 can include one or more of the fields shown above in Tables 1-28. Advancing to 704, the processor 204 decodes the PAID field. Continuing to 706, the processor 204 determines whether the PAID field has a value indicating that an undecoded portion of the SIGNAL unit 520 is to be decoded. At 708, the processor 204 decodes the SIGNAL unit 520 if the value of the PAID field has a value indicating that the SIGNAL unit 520 is to be decoded. At 710, the processor 204 defers for a time if the value of the PAID field does not have a value indicating that the SIGNAL unit 520 is to be decoded.

In at least some embodiments discussed above, the SIGNAL units 520 are coded using a convolutional code, and tail bits are included in the SIGNAL units 520. The tail bits may be all zeros, as in a "zero-tail code," and are used to return the encoder to the zero state, such that the decoding process at the receiver can be initiated from the zero state. By adding the tail bits to the end of each SIGNAL unit 520, the encoder is returned to the zero state before every SIGNAL unit 520. Thus, each SIGNAL unit 520 may be encoded separately from every other SIGNAL unit 520 by re-initialization of the encoder before every SIGNAL unit 520. The independently encoded SIGNAL units 520 may also be modulated independently. Further, both the start and end states of the encoder are known to a decoder used to decode the SIGNAL unit 520. As such, each SIGNAL unit 520 may be decoded and, in some cases, demodulated separately from each other SIGNAL unit 520.

In some embodiments, the SIGNAL unit 520 can be transmitted as a short block code. For example, any of the embodiments discussed herein may be transmitted as a short block code. Accordingly, in some embodiments, the SIGNAL unit 520 has no tail bits (referred to as "tail biting"). For example, SIGNAL unit 520 may be the same as any of the other embodiments discussed herein except for having no tail bits. For example, any of the embodiments discussed with reference to Tables 1-28 may be transmitted as a short block code without the tail bits.

The SIGNAL unit 520 may be encoded as a linear block code or a short block code using, for example, an extended Hamming code, such as an (8, 4, 4) rate 1/2 extended Hamming code. The SIGNAL unit 520 may be encoded as a short block code using, for example, an extended Golay code, such as a (24, 12, 8) rate 1/2 extended Golay code. The SIGNAL unit 520 may be encoded as a short block code using, for example, a quadratic-residue (QR) code, such as a (48, 24, 12) rate 1/2 QR code. The SIGNAL unit 520 may be encoded as a short block code using, for example, a tail biting convolution code (TBCC), such as a TBCC code discussed below.

When tail biting is used, no tail bits are included in the SIGNAL unit 520. Rather, the last, e.g., "n" bits (where "n" is representative of a predetermined number of bits), of the SIGNAL unit 520 are used to initialize the encoder, making the start and end states of the encoder identical, but not necessarily zero. By using the last "n" bits of the SIGNAL unit 520 to initialize the encoder, each field or sub-field of the SIGNAL unit 520 may be encoded separately from every other field or sub-field by cyclically applying convolutional coding to each field or sub-field. The independently encoded fields or sub-fields may also be modulated independently. With tail biting encoding, the decoder knows that the start and end states of the encoder are identical but does not know what those states are. Thus, the decoder must be able to determine the start and end states in order to decode the field or sub-field, for example, by applying convolutional decoding on a repetition of the received field or sub-field. A decoder may be able to determine the start and end states of the fields or sub-fields from information provided in the preamble. As such, each field or sub-field may be decoded and, in some cases, demodulated separately from each other field or sub-field in the SIGNAL unit 520. When tail biting is used, a CRC may also be added to each field or sub-field, such that determination may be made as to whether each field or sub-field has been decoded successfully, independently of each other field or sub-field in the SIGNAL unit 520. The encoding process may result in a sequence of code symbols for each field or sub-field that may be blocked together and mapped to a signal constellation to produce one or more modulation symbols for each field or sub-field.

Figure 8:
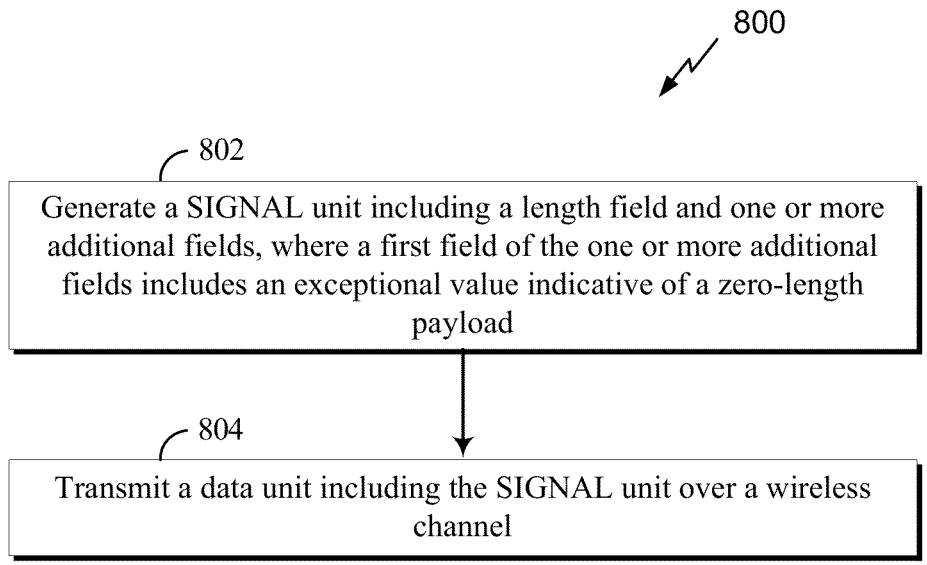
FIG. 8 shows a flow chart of another aspect of an exemplary method for generating and transmitting a data unit.

FIG. 8 shows a flow chart of an aspect of an exemplary method 800 of generating and transmitting a data unit. The method 800 may be used to generate any of the data units and SIGNAL units 520 described above. The data units may be generated at either the AP 104 or the STA 106 and transmitted to another node in the wireless network. Although the method 800 is described below with respect to elements of the wireless device 202a (FIG. 3), those having ordinary skill in the art will appreciate that other components may be used to implement one or more of the steps described herein. Although steps may be described as occurring in a certain order, the steps can be reordered, steps can be omitted, and/or additional steps can be added.

At 802, the processor 204 generates a SIGNAL unit 520. The SIGNAL unit 520 includes at least a length field and one or more additional fields. For example, the SIGNAL unit 520 can include one or more of the fields shown above in Tables 1-28. A first field of the one or more additional fields can include an exceptional value indicative of a zero-length payload. As discussed above, an exceptional value can include a field value outside the normal bounds of operation. In an embodiment, the modulator 302 may modulate a transmission that includes the SIGNAL unit 520, and the transform module 304 may translate tones corresponding to the SIGNAL unit 520 into the time domain. At 804, the transmitter 210 transmits a data unit including the SIGNAL unit 520 over a wireless channel.

Figure 9:
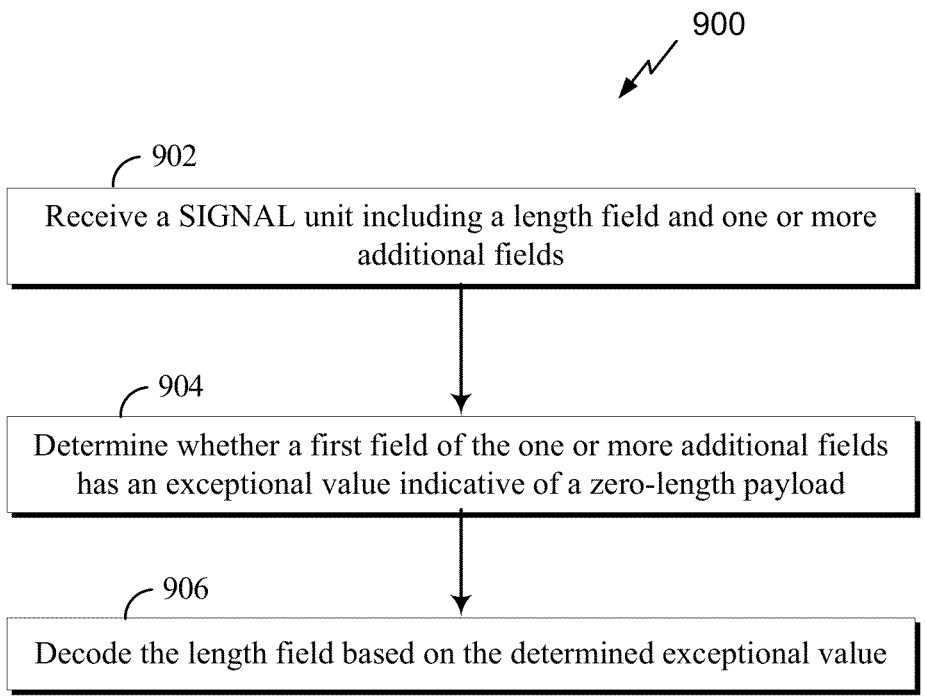
FIG. 9 shows a flow chart of another aspect of an exemplary method for receiving and processing a data unit including a signal unit.

FIG. 9 shows a flow chart of another aspect of an exemplary method 900 of receiving and processing a data unit including a SIGNAL unit 520. The method 900 may be used to receive any of the data units described above. The packets may be received at either the AP 104 or the STA 106 from another node in the wireless network. Although the method 900 is described below with respect to elements of the wireless device 202b (FIG. 4), those having ordinary skill in the art will appreciate that other components may be used to implement one or more of the steps described herein. Although steps may be described as occurring in a certain order, the steps can be reordered, steps can be omitted, and/or additional steps can be added.

At 902, the receiver 212 receives a SIGNAL unit 520. The SIGNAL unit 520 includes at least a length field and one or more additional fields. For example, the SIGNAL unit 520 can include one or more of the fields shown above in Tables 1-28. Continuing to 904, the processor 204 determines whether a first field of the one or more additional fields has an exceptional value indicative of a zero-length payload. As discussed above, an exceptional value can include a field value outside the normal bounds of operation.

Advancing to 906, the processor 204 decodes the length field based on the determined exceptional value. For example, the MCS field may include the exceptional value of all-ones. The processor 204 may then decode the reserved bits and determine an alternative frame type. For example, the processor 204 may determine an ACK frame type. The processor 204 may then decode the bits in the length field in relation to one or more parameters of the ACK frame.

In a particular embodiment, a device may generate a SIG unit (e.g., the SIGNAL unit 520) that includes a length field and an aggregation field. For example, the length field may be nine bits long and the aggregation field may be one bit long. Prior to, after, or during generation of the SIG unit, the device may determine whether or not to use aggregated transmission (e.g., A-MPDUs). In a particular embodiment, aggregated transmission may be mandatory for frame sizes greater than or equal to 512 bytes in size, but may be optional for frame sizes less than 512 bytes. In response to determining to use aggregated transmission, the device may set the aggregation field to a first value (e.g., "1") and may set the length field to a number of symbols. In response to determining not to use aggregated transmission, the device may set the aggregation field to a second value (e.g., "0") and may set the length field to a number of bytes. The device may transmit the SIG unit via a wireless network (a sub-1 GHz network in compliance with an IEEE 802.11ah protocol). The SIG unit may be included in a preamble of a frame, such as a single user (SU) or multi user (MU) frame.

In a particular embodiment, a device may receive a SIG unit (e.g., the SIGNAL unit 520) that includes length field and an aggregation field. The device may interpret the length field as a number of symbols in response to determining that the aggregation field has a first value (e.g., "1"). The device may interpret the length field as a number of bytes in response to determining that the aggregation field has second value (e.g., "1").

In another particular embodiment, the device may initially determine whether the frame including the SIG unit is associated with 1 MHz bandwidth. If the frame is associated with the 1 MHz bandwidth, the device may interpret the length field as a number of bytes or a number of symbols based on the value of the aggregation field, as described above. However, if the frame is not associated with the 1 MHz bandwidth, the device may determine whether the frame has a short format preamble or a long format preamble (e.g., by checking a rotation of the SIG unit). If the frame has the short format preamble, the device may interpret the length field as a number of bytes or a number of symbols based on the value of the aggregation field, as described above. Conversely, if the frame has the long format preamble, the device may determine whether the frame is a SU frame or a MU frame (e.g., by checking an SU/MU field). If the frame is a SU frame, the device may interpret the length field as a number of bytes or a number of symbols based on the value of the aggregation field, as described above. If the frame is a MU frame, the device may automatically interpret the length field as a number of symbols (e.g., because a wireless protocol or standard, such as IEEE 802.11ah, may mandate that the length of a MU frame having a long format preamble be represented as a number of symbols).

Figure 10:
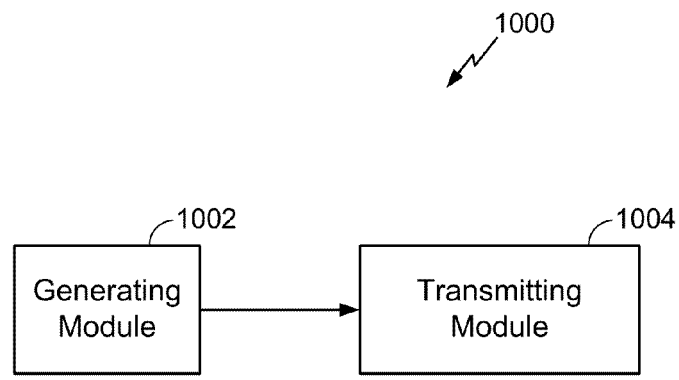
FIG. 10 is a functional block diagram of another exemplary wireless device that may be employed within the wireless communication system of FIG. 1.

FIG. 10 is a functional block diagram of another exemplary wireless device 1000 that may be employed in accordance with the present disclosure. The device 1000 includes a generating module 1002 for generating a data unit for wireless transmission. The generating module 1002 may be configured to perform one or more of the functions discussed above with respect to block 602 of FIG. 6 and/or block 802 of FIG. 8. The generating module 1002 may correspond to one or more of the processor 204 and the DSP 220. The device 1000 further includes a transmitting module 1004 for wirelessly transmitting the data unit. The transmitting module 1004 may be configured to perform one or more of the functions discussed above with respect to block 604 of FIG. 6 and/or block 804 of FIG. 8. The transmitting module 1004 may correspond to the transmitter 210. In a particular embodiment, the data unit may include a SIGNAL unit (e.g., the SIGNAL unit 520), where a length field of the SIGNAL unit is interpreted based on a value of an aggregation field and/or where a particular field of the SIGNAL unit has a value indicating a zero-length payload.

Figure 11:
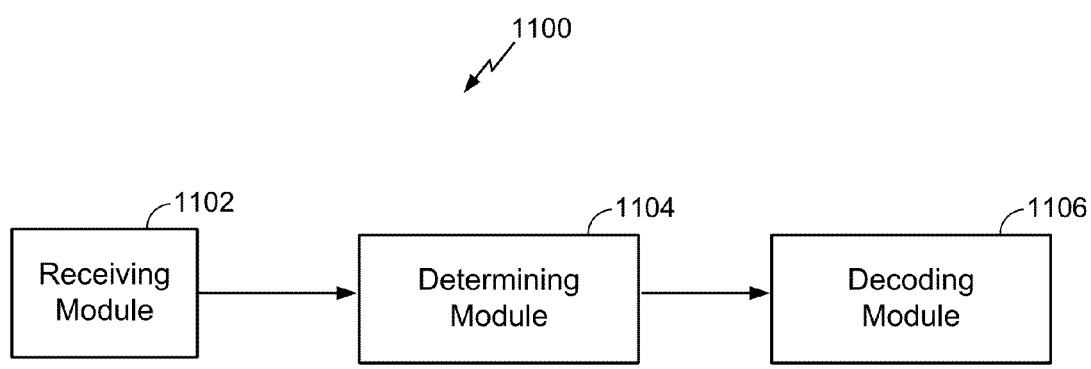
FIG. 11 is a functional block diagram of yet another exemplary wireless device that may be employed within the wireless communication system of FIG. 1.

FIG. 11 is a functional block diagram of yet another exemplary wireless device 1100 that may be employed in accordance with the present disclosure. The device 1100 includes a receiving module 1102 for wirelessly receiving a data unit. The receiving module 1102 may be configured to perform one or more of the functions discussed above with respect to block 702 of FIG. 7 and/or block 902 of FIG. 9. The receiving module 1102 may correspond to the receiver 212, and may include the amplifier 401.

The device 1100 further includes a determining module 1104 for determining various characteristics of the data unit. For example, the determining module 1104 may determine whether a first field of the one or more additional fields has an exceptional value indicative of a zero-length payload. As discussed above, an exceptional value can include a field value outside the normal bounds of operation. As another example, the determining module may determine a PAID field has a value indicating that an undecoded portion of a SIG unit is to be decoded. The determining module 1104 may be configured to perform one or more of the functions discussed above with respect to block 904 of FIG. 9 and/or block 706 of FIG. 7. The determining module 1104 may correspond to one or more of the processor 204, the signal detector 218, and the DSP 220.

The device 1100 further includes a decoding module 1106 for decoding data. For example, the decoding module 1106 may decode the length field based on the determined exceptional value. The decoding module 1106 may also decode a PAID field and a SIG unit if a value of the PAID field indicates that the SIG unit is to be decoded. The decoding module 1106 may defer for a time if the value of the PAID field indicates that the SIG unit is not to be decoded. The decoding module 1106 may be configured to perform one or more of the functions discussed above with respect to block 704 of FIG. 7, block 708 of FIG. 7, block 710 of FIG. 7, and/or block 906 of FIG. 9. The decoding module 1106 may correspond to one or more of the processor 204, the signal detector 218, and the DSP 220, and may include the channel estimator and equalizer 405.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: only a; only b; only c; a and b; a and c; b and c; and a, b, and c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer-readable medium may include non-transitory computer-readable medium (e.g., tangible media). In addition, in some aspects computer-readable medium may include transitory computer-readable medium (e.g., a signal). Combinations of the above should also be included within the scope of computer-readable media.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method comprising:
    receiving, at a first wireless device from a second wireless device, a signal (SIG) unit via a sub-1 gigahertz (GHz) wireless network; and
    interpreting a 9-bit length field of the SIG unit,
    wherein the 9-bit length field is interpreted as a number of symbols in response to determining that a 1-bit aggregation field of the SIG unit has a first value,
    wherein the 9-bit length field is interpreted as a number of bytes in response to determining that the 1-bit aggregation field has a second value,
    wherein the SIG unit corresponds to a short format preamble and a bandwidth greater than or equal to 2 megahertz (MHz), and
    wherein the SIG unit comprises:
        a 1-bit first reserved field;
        a 1-bit space-time block code (STBC) field;
        a 1-bit second reserved field;
        a 2-bit bandwidth field;
        a 2-bit number of space time streams field;
        a 9-bit partial association identifier field;
        a 1-bit short guard interval (SGI) field;
        a 2-bit coding field;
        a 4-bit modulation and coding scheme (MCS) field;
        a 1-bit smoothing field;
        the 1-bit aggregation field;
        the 9-bit length field;
        a 2-bit acknowledgement (ACK) indication field;
        a 4-bit cyclic redundancy check (CRC) field; and
        a 6-bit tail field.

2. The method of claim 1, wherein the sub-1 GHz wireless network operates in accordance with an Institute of Electrical and Electronics Engineers (IEEE) 802.11ah protocol.

3. The method of claim 2, wherein the 1-bit STBC field and the 1-bit SGI field precede the 1-bit smoothing field.

4. The method of claim 1, wherein the 1-bit aggregation field indicates whether the second wireless device is transmitting aggregated media access control (MAC) protocol data units (A-MPDUs) to the first wireless device.

5. The method of claim 1, wherein the SIG unit comprises two orthogonal frequency-division multiplexing (OFDM) symbols, wherein the SIG unit is encoded at a rate of one-half, and wherein the SIG unit corresponds to a binary phase-shift keying (BPSK) constellation.

6. The method of claim 1, wherein the SIG unit is included in a preamble of a packet.

7. An apparatus comprising:
    a receiver configured to receive a signal (SIG) unit via a sub-1 gigahertz (GHz) wireless network; and
    a processor configured to:
        interpret a 9-bit length field of the SIG unit as a number of symbols in response to determining that a 1-bit aggregation field of the SIG unit has a first value; and
        interpret the 9-bit length field as a number of bytes in response to determining that the 1-bit aggregation field has a second value,
    wherein the SIG unit corresponds to a short format preamble and a bandwidth greater than or equal to 2 megahertz (MHz), and
    wherein the SIG unit comprises:
        a 1-bit first reserved field;
        a 1-bit space-time block code (STBC) field;
        a 1-bit second reserved field;
        a 2-bit bandwidth field;
        a 2-bit number of space time streams field;
        a 9-bit partial association identifier field;
        a 1-bit short guard interval (SGI) field;
        a 2-bit coding field;
        a 4-bit modulation and coding scheme (MCS) field;
        a 1-bit smoothing field;
        the 1-bit aggregation field;
        the 9-bit length field;
        a 2-bit acknowledgement (ACK) indication field;
        a 4-bit cyclic redundancy check (CRC) field; and
        a 6-bit tail field.

8. The apparatus of claim 7, wherein the 1-bit aggregation field indicates whether data received by the receiver corresponds to one or more aggregated media access control (MAC) protocol data units (A-MPDUs).

9. An apparatus comprising:
    means for receiving a signal (SIG) unit via a sub-1 gigahertz (GHz) wireless network; and
    means for processing for interpreting a 9-bit length field of the SIG unit,
    wherein the means for processing interprets the 9-bit length field as a number of symbols in response to determining that a 1-bit aggregation field of the SIG unit has a first value,
    wherein the means for processing interprets the 9-bit length field as a number of bytes in response to determining that the 1-bit aggregation field has a second value,
    wherein the SIG unit corresponds to a short format preamble and a bandwidth greater than or equal to 2 megahertz (MHz), and
    wherein the SIG unit comprises:
        a 1-bit first reserved field;
        a 1-bit space-time block code (STBC) field;
        a 1-bit second reserved field;
        a 2-bit bandwidth field;
        a 2-bit number of space time streams field;
        a 9-bit partial association identifier field;
        a 1-bit short guard interval (SGI) field;
        a 2-bit coding field;
        a 4-bit modulation and coding scheme (MCS) field;
        a 1-bit smoothing field;
        the 1-bit aggregation field;
        the 9-bit length field;
        a 2-bit acknowledgement (ACK) indication field;
        a 4-bit cyclic redundancy check (CRC) field; and
        a 6-bit tail field.

10. A non-transitory computer-readable medium comprising instructions that, when executed by a computer, cause the computer to:

receive a signal (SIG) unit via a sub-1 gigahertz (GHz) wireless network; and
interpret a 9-bit length field of the SIG unit,
wherein the 9-bit length field is interpreted as a number of symbols in response to determining that a 1-bit aggregation field of the SIG unit has a first value,
wherein the 9-bit length field is interpreted as a number of bytes in response to determining that 1-bit aggregation field has a second value,
wherein the SIG unit corresponds to a short format preamble and a bandwidth greater than or equal to 2 megahertz (MHz), and
wherein the SIG unit comprises:
   a 1-bit first reserved field;
   a 1-bit space-time block code (STBC) field;
   a 1-bit second reserved field;
   a 2-bit bandwidth field;
   a 2-bit number of space time streams field;
   a 9-bit partial association identifier field;
   a 1-bit short guard interval (SGI) field;
   a 2-bit coding field;
   a 4-bit modulation and coding scheme (MCS) field;
   a 1-bit smoothing field;
   the 1-bit aggregation field;
   the 9-bit length field;
   a 2-bit acknowledgement (ACK) indication field;
   a 4-bit cyclic redundancy check (CRC) field; and
   a 6-bit tail field.

11. A method comprising:
receiving, at a first wireless device from a second wireless device, a signal (SIG) unit via a sub-1 gigahertz (GHz) wireless network; and
interpreting a 9-bit length field of the SIG unit,
wherein the 9-bit length field is interpreted as a number of symbols in response to determining that a 1-bit aggregation field of the SIG unit has a first value,
wherein the 9-bit length field is interpreted as a number of bytes in response to determining that the 1-bit aggregation field has a second value,
wherein the SIG unit corresponds to a long format single user (SU) preamble and a bandwidth greater than or equal to 2 megahertz (MHz), and
wherein the SIG unit comprises:
   a 1-bit multi user (MU)/SU field;
   a 1-bit space-time block code (STBC) field;
   a 1-bit reserved field;
   a 2-bit bandwidth field;
   a 2-bit number of space time streams field;
   a 9-bit partial association identifier field;
   a 1-bit short guard interval (SGI) field;
   a 2-bit coding field;
   a 4-bit modulation and coding scheme (MCS) field;
   a 1-bit beam-change indication field;
   the 1-bit aggregation field;
   the 9-bit length field;
   a 2-bit acknowledgement (ACK) indication field;
   a 4-bit cyclic redundancy check (CRC) field; and
   a 6-bit tail field.

12. The method of claim 11, wherein the SIG unit comprises two orthogonal frequency-division multiplexing (OFDM) symbols, wherein the SIG unit is encoded at a rate of one-half, and wherein the SIG unit corresponds to a binary phase-shift keying (BPSK) constellation.

13. A method comprising:
receiving, at a first wireless device from a second wireless device, a signal (SIG) unit via a sub-1 gigahertz (GHz) wireless network; and
interpreting a 9-bit length field of the SIG unit as a number of symbols,
wherein the SIG unit corresponds to a long format multi user (MU) preamble and a bandwidth greater than or equal to 2 megahertz (MHz), and
wherein the SIG unit comprises:
   a 1-bit MU/single user (SU) field;
   a 1-bit space-time block code (STBC) field;
   a 1-bit first reserved field;
   an 8-bit number of space time streams field, wherein the number of space time streams field includes four 2-bit values corresponding to four users;
   a 2-bit bandwidth field;
   a 6-bit group identifier (GID) field;
   a 1-bit short guard interval (SGI) field;
   a 4-bit first coding field;
   a 1-bit second coding field;
   a 1-bit second reserved field;
   the 9-bit length field;
   a 2-bit acknowledgement (ACK) indication field;
   a 4-bit cyclic redundancy check (CRC) field; and
   a 6-bit tail field.

14. The method of claim 13, wherein the SIG unit comprises two orthogonal frequency-division multiplexing (OFDM) symbols, wherein the SIG unit is encoded at a rate of one-half, and wherein the SIG unit corresponds to a binary phase-shift keying (BPSK) constellation.

15. A method comprising:
receiving, at a first wireless device from a second wireless device, a signal (SIG) unit via a sub-1 gigahertz (GHz) wireless network; and
interpreting a 9-bit length field of the SIG unit,
wherein the 9-bit length field is interpreted as a number of symbols in response to determining that a 1-bit aggregation field of the SIG unit has a first value,
wherein the 9-bit length field is interpreted as a number of bytes in response to determining that the 1-bit aggregation field has a second value,
wherein the SIG unit corresponds to a 1 megahertz (MHz) bandwidth-rftede, and
wherein the SIG unit comprises:
   a 2-bit number of space time streams field;
   a 1-bit short guard interval (SGI) field;
   a 2-bit coding field;
   a 1-bit space-time block code (STBC) field;
   a 1-bit first reserved field;
   a 4-bit modulation and coding scheme (MCS) field;
   the 1-bit aggregation field;
   the 9-bit length field;
   a 2-bit acknowledgement (ACK) indication field;
   a 4-bit cyclic redundancy check (CRC) field; and
   a 6-bit tail field.

16. The method of claim 15, wherein the SIG unit comprises six orthogonal frequency-division multiplexing (OFDM) symbols, wherein the SIG unit is encoded at a rate of one-half, and wherein the SIG unit corresponds to a binary phase-shift keying (BPSK) constellation.

* * * * *